(12) United States Patent
Abu-Ghazaleh et al.

(10) Patent No.: US 12,417,083 B2
(45) Date of Patent: Sep. 16, 2025

(54) COALESCING OPERAND REGISTER FILE FOR GRAPHICAL PROCESSING UNITS

(71) Applicant: THE REGENTS OF THE UNIVERSITY OF CALIFORNIA, Oakland, CA (US)

(72) Inventors: Nael Abu-Ghazaleh, Riverside, CA (US); Hodjat Asghari Esfeden, Sunnyvale, CA (US); Daniel Wong, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 87 days.

(21) Appl. No.: 17/424,468

(22) PCT Filed: Jan. 24, 2020

(86) PCT No.: PCT/US2020/015078
§ 371 (c)(1),
(2) Date: Jul. 20, 2021

(87) PCT Pub. No.: WO2020/154678
PCT Pub. Date: Jul. 30, 2020

(65) Prior Publication Data
US 2022/0100484 A1 Mar. 31, 2022

Related U.S. Application Data

(60) Provisional application No. 62/796,887, filed on Jan. 25, 2019.

(51) Int. Cl.
*G06F 8/41* (2018.01)
*G06F 9/30* (2018.01)

(52) U.S. Cl.
CPC .......... *G06F 8/443* (2013.01); *G06F 9/30109* (2013.01); *G06F 9/3012* (2013.01)

(58) Field of Classification Search
CPC ....... G06F 8/441–4443; G06F 9/30098–30141
See application file for complete search history.

(56) References Cited

U.S. PATENT DOCUMENTS 7,339,592 B2 3/2008 Lindholm et al.
8,234,489 B2 * 7/2012 Williamson .......... G06F 9/3891
713/165

(Continued)

OTHER PUBLICATIONS

Jeon, H., et al., "Register File Virtualization", Proceedings of the 48th International Symposium on Microarchitecture [online], 2015 [retrieved Jun. 15, 2023], Retrieved from Internet: <URL: https://dl.acm.org/doi/abs/10.1145/2830772.2830784>, pp. 420-432.*

(Continued)

*Primary Examiner* — Todd Aguilera
(74) *Attorney, Agent, or Firm* — Ivan Miles Posey, Esq.

(57) ABSTRACT

A system and method for register coalescing is described. The system comprises a CORF, a coalescing-aware register file design for GPUs that simultaneously reduces the leakage and dynamic access power, while improving the overall performance of the GPU. CORF achieves these properties by enabling the reads to multiple operands that are packed together to be coalesced, reducing the number of reads to the RF, and improving dynamic energy and performance. CORF combines compiler-assisted register allocation with a reorganized register file (CORF++) in order to maximize operand coalescing opportunities.

14 Claims, 19 Drawing Sheets

(56) References Cited

U.S. PATENT DOCUMENTS

| | | | | |
|---|---|---|---|---|
| 8,904,151 | B2* | 12/2014 | Gschwind | G06F 9/3017 712/220 |
| 2007/0260855 | A1* | 11/2007 | Gschwind | G06F 9/30196 712/213 |
| 2008/0215856 | A1 | 9/2008 | Gschwind et al. | |
| 2011/0016338 | A1* | 1/2011 | Williamson | G06F 9/3891 712/228 |
| 2013/0117548 | A1 | 5/2013 | Grover et al. | |
| 2016/0103787 | A1 | 4/2016 | Forsyth et al. | |
| 2017/0060588 | A1 | 3/2017 | Choi | |
| 2018/0293701 | A1 | 10/2018 | Appu et al. | |

OTHER PUBLICATIONS

Tang, F., et al., "Balanced bipartite graph based register allocation for network processors in mobile and wireless networks", Mobile Information Systems, vol. 6, No. 1 [online], 2010 [retrieved Jun. 15, 2023], Retrieved from Internet: <URL: https://downloads.hindawi.com/journals/misy/2010/986192.pdf>, pp. 65-83.*

Voitsechov, D., et al. "Software-Directed Techniques for Improved GPU Register File Utilization", ACM Trans. Archit. Code Optim., vol. 15 No. 3 [online], Sep. 2018 [retrieved Aug. 9, 2024], Retrieved from Internet: <URL: https://dl.acm.org/doi/pdf/10.1145/3243905>, whole document.*

The Regents of the University of California, Related Application, PCT Application No. PCT/US20/15078; International Search Report and Written Opinion, Dated Apr. 14, 2020.

The Regents of the University of California, Related Application, PCT Application No. PCT/US20/15078; International Preliminary Report on Patentability, Dated Jul. 27, 2021.

The Regents of the University of California, Related Application, European Patent Application No. 20744798.8; Supplemental Search Report, Dated Sep. 12, 2022.

Related Application, European Patent Application No. 20744798.8; Communication pursuant to Article 94(3)EPC, Dated Jul. 5, 2023.

Related Application, European Patent Application No. 20744798.8; Communication pursuant to Article 94(3)EPC, Dated Mar. 27, 2024.

Related Application, European Patent Application No. 20744798.8; Communication pursuant to Article 94(3)EPC, Dated Nov. 27, 2023.

Related Application, PCT International Application, PCT/US2020/015078; The International Search Report and the Written Opinion of the International, Searching Authority, or the Declaration. Dated Apr. 14, 2020.

Youtao Zhang, Jun Yang, and Rajiv Gupta. Frequent value locality and value-centric data cache design. In Proceedings of the Ninth International Conference on Architectural Support for Programming Languages and Operating Systems, Asplos IX, 2000.

Whitepaper: NVIDIAs Next Generation CUDA Compute Architecture: Fermi.

Whitepaper: NVIDIA GeForce GTX 980.

Whitepaper: NVIDIAs Next Generation CUDA Compute Architecture: KeplerGK110.

Zahra Yarahmadi. Study of the Bipartite Edge Frustration of Graphs, pp. 249-267. Springer International Publishing, Cham, 2016.

Jun Yang, Youtao Zhang, and Rajiv Gupta. Frequent value compression in data caches. In Proceedings of the 33rd Annual ACM/IEEE International Symposium on Microarchitecture, MICRO 33, 2000.

Tango: A deep neural network benchmark suite for various accelerators. https://gitlab.com/Tango-DNNbench/Tango.

M. Abdel-Majeed, A. Shafaei, H. Jeon, M. Pedram, and M. Annavaram. Pilot register file: Energy efficient partitioned register file for gpus. In 2017 IEEE International Symposium on High Performance Computer Architecture (HPCA), 2017.

Mohammad Abdel-Majeed and Murali Annavaram. Warped register file: A power efficient register file for gpgpus. In High Performance Computer Architecture (HPCA2013), 2013 IEEE 19th International Symposium on, pp. 412-423. IEEE, 2013.

Mohammad Abdel-Majeed, Daniel Wong, and Murali Annavaram. Warped gates: Gating aware scheduling and power gating for gpgpus. In Microarchitecture (MICRO), 2013 46th Annual IEEE/ACM International Symposium on, 2013.

Mohammad Abdel-Majeed, Daniel Wong, Justin Kuang, and Murali Annavaram. Origami: Folding warps for energy efficient gpus. In Proceedings of the 2016 International Conference on Supercomputing, ICS '16, 2016.

Alaa R. Alameldeen and David A. Wood. Adaptive cache compression for high-performance processors. In Proceedings of the 31st Annual International Symposium on Computer Architecture, ISCA '04, 2004.

Ali Bakhoda, George L Yuan, Wilson WL Fung, Henry Wong, and Tor M Aamodt. Analyzing cuda workloads using a detailed gpu simulator. In Performance Analysis of Systems and Software, 2009. ISPASS 2009. IEEE International Symposium on, pp. 163-174. IEEE, 2009.

Preston Briggs. Register allocation via graph coloring. Technical report, 1992.

N. Chatterjee, M. O'Connor, D. Lee, D. R. Johnson, S. W. Keckler, M. Rhu, and W. J. Dally. Architecting an energy-efficient dram system for gpus. In 2017 IEEE International Symposium on High Performance Computer Architecture (HPCA), 2017.

Shuai Che, Michael Boyer, Jiayuan Meng, David Tarjan, Jeremy W Sheaffer, Sang-Ha Lee, and Kevin Skadron. Rodinia: A benchmark suite for heterogeneous computing. In Workload Characterization, 2009. IISWC 2009. IEEE International Symposium on, pp. 44-54. Ieee, 2009.

Oguz Ergin, Deniz Balkan, Kanad Ghose, and Dmitry Ponomarev. Register packing: Exploiting narrow-width operands for reducing register file pressure. In Proceedings of the 37th annual IEEE/ACM International Symposium on Microarchitecture, pp. 304-315. IEEE Computer Society, 2004.

Mark Gebhart, Daniel R Johnson, David Tarjan, Stephen W Keckler, William J Dally, Erik Lindholm, and Kevin Skadron. Energy-efficient mechanisms for managing thread context in throughput processors. In ACM SIGARCH Computer Architecture News, vol. 39, pp. 235-246. ACM, 2011.

Mark Gebhart, Stephen W Keckler, and William J Dally. A compiletime managed multi-level register file hierarchy. In Proceedings of the 44th annual IEEE/ACM international symposium on microarchitecture, pp. 465-476. ACM, 2011.

Lal George and Andrew W. Appel. Iterated register coalescing. ACM Trans. Program. Lang. Syst., 18(3):300-324, May 1996.

Syed Zohaib Gilani, Nam Sung Kim, and Michael J Schulte. Powerefficient computing for compute-intensive gpgpu applications. In High Performance Computer Architecture (HPCA2013), 2013 IEEE 19th International Symposium on, pp. 330-341. IEEE, 2013.

Onur Kayiran, Adwait Jog, Ashutosh Pattnaik, Rachata Ausavarungnirun, Xulong Tang, Mahmut T. Kandemir, Gabriel H. Loh, Onur Mutlu, and Chita R. Das. mc-states: Fine-grained gpu datapath power management. In Proceedings of the 2016 International Conference on Parallel Architectures and Compilation, PACT '16, 2016.

Farzad Khorasani, Hodjat Asghari Esfeden Amin Farmahini-Farahani, and Nuwan Jayasena Vivek Sarkar. Regmutex: Inter-warp gpu register time-sharing. ISCA, 2018.

John Kloosterman, Jonathan Beaumont, D Anoushe Jamshidi, Jonathan Bailey, Trevor Mudge, and Scott Mahlke. Regless: just-in-time operand staging for gpus. In Proceedings of the 50th Annual IEEE/ACM International Symposium on Microarchitecture, pp. 151-164. ACM, 2017.

Sangpil Lee, Keunsoo Kim, Gunjae Koo, Hyeran Jeon, Won Woo Ro, and Murali Annavaram. Warped-compression: Enabling power efficient gpus through register compression. In ACM SIGARCH Computer Architecture News, vol. 43, pp. 502-514. ACM, 2015.

Jingwen Leng, Tayler Hetherington, Ahmed ElTantawy, Syed Gilani, Nam Sung Kim, Tor M Aamodt, and Vijay Janapa Reddi. Gpuwattch: enabling energy optimizations in gpgpus. In ACM SIGARCH Computer Architecture News, vol. 41, pp. 487-498. ACM, 2013.

(56) References Cited

OTHER PUBLICATIONS

Z. Liu, S. Gilani, M. Annavaram, and N S. Kim. G-scalar: Costeffective generalized scalar execution architecture for power-efficient gpus. In 2017 IEEE International Symposium on High Performance Computer Architecture (HPCA), 2017.

A. Majumdar, L. Piga, I. Paul, J. L. Greathouse, W. Huang, and D. H. Albonesi. Dynamic gpgpu power management using adaptive model predictive control. In 2017 IEEE International Symposium on High Performance Computer Architecture (HPCA), 2017.

Sparsh Mittal and Jeffrey S. Vetter. A survey of methods for analyzing and improving gpu energy efficiency. ACM Comput. Surv., 47(2):19:1-19:23, Aug. 2014.

Sparsh Mittal and Jeffrey S. Vetter. A survey of architectural approaches for data compression in cache and main memory systems. IEEE Trans. Parallel Distrib. Syst., 27(5):1524-1536, May 2016.

Jinpyo Park and Soo-Mook Moon. Optimistic register coalescing. ACM Trans. Program. Lang. Syst., 26(4):735-765, Jul. 2004.

G. Pekhimenko, E. Bolotin, N. Vijaykumar, O. Mutlu, T. C. Mowry, and S. W. Keckler. A case for toggle-aware compression for gpu systems. In 2016 IEEE International Symposium on High Performance Computer Architecture (HPCA), 2016.

Gennady Pekhimenko, Vivek Seshadri, Onur Mutlu, Phillip B. Gibbons, Michael A. Kozuch, and Todd C. Mowry. Base-delta-immediate compression: Practical data compression for on-chip caches. In Proceedings of the 21st International Conference on Parallel Architectures and Compilation Techniques, PACT '12, 2012.

Mohammad Sadrosadati, Amirhossein Mirhosseini, Seyed Borna Ehsani, Hamid Sarbazi-Azad, Mario Drumond, Babak Falsafi, Rachata Ausavarungnirun, and Onur Mutlu. Ltrf: Enabling high-capacity register files for gpus via hardware/software cooperative register prefetching. In Proceedings of the Twenty-Third International Conference on Architectural Support for Programming Languages and Operating Systems, pp. 489-502. ACM, 2018.

A. Sethia, G. Dasika, M. Samadi, and S. Mahlke. Apogee: Adaptive prefetching on gpus for energy efficiency. In Proceedings of the 22nd International Conference on Parallel Architectures and Compilation Techniques, 2013.

A. Sethia and S. Mahlke. Equalizer: Dynamic tuning of gpu resources for efficient execution. In 2014 47th Annual IEEE/ACM International Symposium on Microarchitecture, 2014.

Premkishore Shivakumar and Norman P Jouppi. Cacti 3.0: An integrated cache timing, power, and area model, 2001. Technical Report 2001/2, Compaq Computer Corporation.

John A Stratton, Christopher Rodrigues, I-Jui Sung, Nady Obeid, Li-Wen Chang, Nasser Anssari, Geng Daniel Liu, and Wen-Mei W Hwu. Parboil: A revised benchmark suite for scientific and commercial throughput computing. Center for Reliable and High-Performance Computing, 127, 2012.

Nandita Vijaykumar, Gennady Pekhimenko, Adwait Jog, Abhishek Bhowmick, Rachata Ausavarungnirun, Chita Das, Mahmut Kandemir, Todd C. Mowry, and Onur Mutlu. A case for core-assisted bottleneck acceleration in gpus: Enabling flexible data compression with assist warps. In Proceedings of the 42Nd Annual International Symposium on Computer Architecture, ISCA '15, 2015.

X. Wang and W. Zhang. Gpu register packing: Dynamically exploiting narrow-width operands to improve performance. In 2017 IEEE Trustcom/BigDataSE/ICE SS, 2017.

Daniel Wong, Nam S. Kim, and Murali Annavaram. Approximating warps with intra-warp operand value similarity. In 2016 IEEE International Symposium on High Performance Computer Architecture (HPCA), 2016.

G. Wu, J. L. Greathouse, A. Lyashevsky, N. Jayasena, and D. Chiou. Gpgpu performance and power estimation using machine learning. In 2015 IEEE 21st International Symposium on High Performance Computer Architecture (HPCA), 2015.

Qiumin Xu and Murali Annavaram. Pattern aware scheduling and power gating for gpgpus. In Parallel Architectures and Compilation Techniques (PACT), 2014 23nd International Conference on, 2014.

\* cited by examiner

Fig. 18
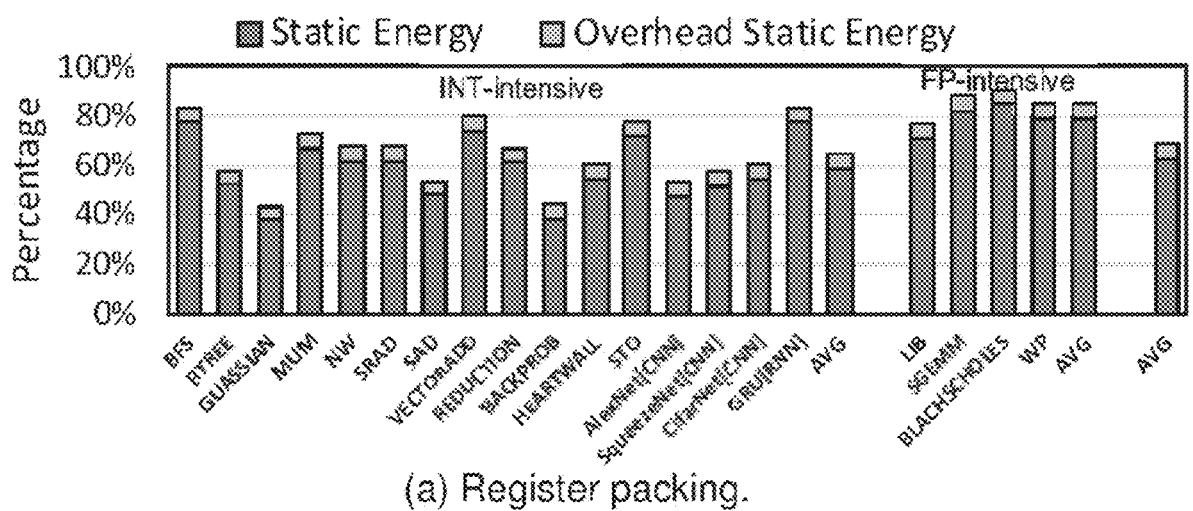
(a) Register packing.
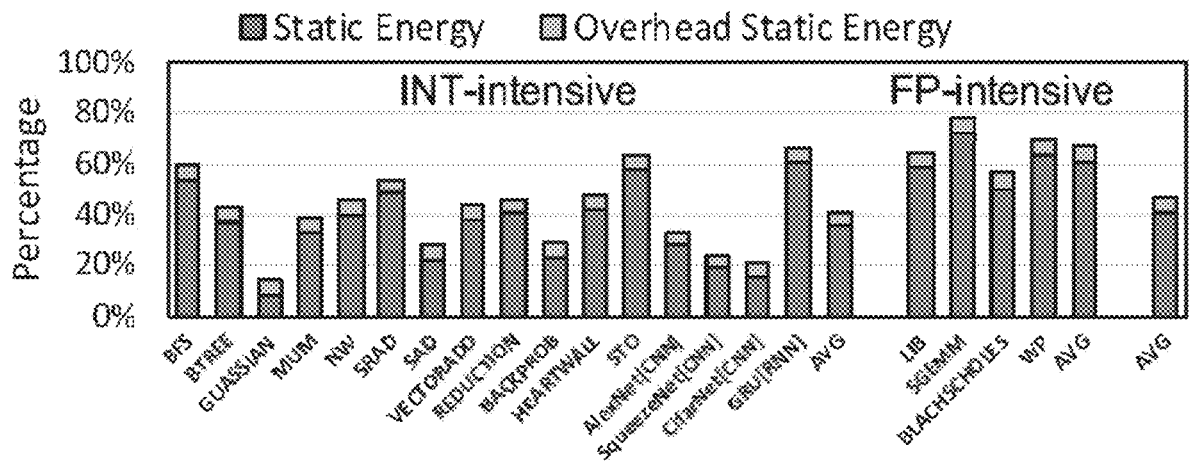

COALESCING OPERAND REGISTER FILE FOR GRAPHICAL PROCESSING UNITS

CROSS-REFERENCE TO RELATED APPLICATIONS

This application is the 371 National Phase Entry of PCT Application No. PCT/US20/15078, filed on Jan. 24, 2020, which claims the benefit of the filing date of U.S. Provisional Patent Application No. 62/796,887, filed on Jan. 25, 2019, which is hereby expressly incorporated by reference.

TECHNICAL FIELD

This disclosure relates generally to a coalescing operand register file for graphics processing units (GPUs). More specifically, a compiler-assisted coalescing operand register file (CORF) performs register coalescing by combining reads to multiple registers required by a single instruction, into a single physical read.

BACKGROUND

The register file (RF) is a critical structure in GPUs: it maintains the states for a large number of threads that are needed to support the GPU processing model. The register file organization substantially affects the overall performance and the energy efficiency of a GPU. For example, the register file consumes a substantial amount of the dynamic energy of the GPU due to its frequent access, and the limited ports on the operand collectors and the register file banks also affect performance as register operations are serialized to manage port contention.

Over the past decade, GPUs have continued to grow in terms of performance and size. The number of execution units has been steadily increasing over time, which in turn increases the number of concurrent thread contexts needed to keep these units utilized. In order to support fast context switching between large groups of active threads, GPUs invest in large register files to allow each thread to maintain its context at all time. This design enables fine-grained switching between executing groups of threads, which is necessary to hide the latency of data accesses to sustain high throughput. For example, the NVIDIA® Volta® GPU has 80 streaming multiprocessors each with a 256 KB register file (64K registers, each 32-bit wide) for a total of 20 MB register file space on the chip. The register file is the largest SRAM structure on die; it is accessed continuously, making it a critical structure with respect to performance, and one of the most power-hungry components on the GPU. In 2013, it was estimated that 18% of the total power consumption on a GPU chip is due to the register file—a percentage that is likely to have increased as the size of the RFs have continued to increase.

Thus, there is a need for a system and method that provides enhanced performance (while at the same time saves power consumption) of register operations for GPUs. The invention described and claimed herein provides such enhancement.

SUMMARY

This disclosure relates to a coalescing operand register file for graphics processing units (GPUs). In one aspect of the disclosure, a compiler-assisted coalescing operand register file performs register coalescing by combining reads to multiple registers required by a single instruction, into a single physical read. To enable register coalescing, CORF utilizes register packing to co-locate narrow-width operands in the same physical register. CORF uses compiler hints to identify which register pairs are commonly accessed together. CORF saves dynamic energy by reducing the number of physical register file accesses, and improves performance by combining read operations, as well as by reducing pressure on the register file. To increase the coalescing opportunities, the physical register file is configured to allow coalescing reads across different physical registers that reside in mutually exclusive sub-banks. This called herein CORF++. The compiler analysis for register allocation for CORF++ becomes a form of graph coloring called the bipartite frustration problem. CORF++ reduces the dynamic energy of the RF by at least 17%, and improves performance measured as instructions per cycle (IPC) by at least 9%.

In some implementations, the system improves the performance and energy efficiency of GPU register files by introducing register coalescing. Similar to memory coalescing where contiguous memory accesses are combined into a single memory request, register coalescing combines multiple register reads from the same instruction into a single physical register read, provided these registers are stored in the same physical register entry. Specifically, register coalescing opportunities are possible when register packing is used, where multiple narrow-width registers are stored into the same physical register. In contrast to register packing, which requires one separate read access for each architectural register read, register coalescing allows combining of read operations to multiple architectural registers that are stored together in the same physical register entry. Register coalescing reduces dynamic access energy, improves register file bandwidth, reduces contention for register file and operand collector ports, and therefore improves overall performance.

In another aspect of the disclosure, a coalescing operand register file (CORF) is configured to take advantage of register coalescing opportunities through a combination of compiler-guided register allocation and coalescing-aware register organization. In one implementation, one method of increasing register coalescing opportunities is to ensure that related registers, or registers that show up as source operands in the same instruction, are stored together in the same physical register entry. In one implementation, the system and method first identify exclusive common pairs of registers that are most frequently accessed together within the same instruction. If both common pair registers are narrow width and are packed together into the same physical register entry, then accesses to these registers (in the same instruction) can be coalesced. CORF reduces the number of physical register accesses, resulting in a at least a 8.5% reduction in register file dynamic energy, and at least 4% increase in IPC due to the reduction in register file and operand collector port conflicts.

In one implementation of CORF, by example, and not by limitation, each register is coalesced exclusively with one other register, which in one implementation may limit the opportunities for coalescing registers that are frequently read with several other registers.

However, in another implementation, to further increase register coalescing opportunities, a method and system, branded as CORF++, provides a re-architected coalescing-aware register file organization that enables coalescing reads from non-overlapping sub-banks across different physical register entries. Thus, reads to any two registers that reside in non-overlapping sub-banks, even if they reside in different physical register entries, can be coalesced together. To maximize the opportunities for coalescing, the system and method introduce a compiler-guided run-time register allocation policy which takes advantage of this reorganization. In particular, the compiler can solve a graph coloring variant called the bipartite graph frustration problem to optimize allocation. Since the problem is NP-hard, the system and method may use a heuristic to determine how to allocate the registers effectively. CORF ++ is able to substantially improve register coalescing opportunities, leading to a reduction in dynamic register file energy by at least 17% and an IPC improvement of at least 9%.

In one implementation, as a secondary contribution, CORF can be combined seamlessly with register file virtualization to further reduce the overall effective register file size resulting in an overall reduction of over 50%. In particular, both register file packing and register virtualization are orthogonal and combine in benefit, where both utilize indirection using of a renaming table, amortizing this common overhead. This reduction in register file size can be leveraged for other optimizations, such as to power gate unused registers to save static power, or to enable more kernel blocks/threads to be supported using the same register file to improve performance.

In summary, the system and method make the following contributions:

Register read coalescing is introduced, enabling the combination of multiple register reads into a single physical read. CORF RF implements coalescing guided by utilizing compiler-guided hints to identify commonly occurring register pairs.

CORF++, which comprises re-organized register file organization, enables coalescing across different physical registers, and a compiler-guided allocation policy that optimizes allocation against this new register file. This new policy relies on compile-time graph coloring analysis, solving the bipartite graph frustration problem.

CORF++ and register file virtualization are combined so that their benefits add up (CORF++ optimizes in space, while virtualization optimizes in time), but their overheads do not (both can share a single renaming table), resulting in the smallest known effective register file size among register compression methods.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF DRAWINGS

FIG. 18 is another graph that shows the dynamic energy and leakage energy impact of the system's methods.

DETAILED DESCRIPTION

GPU Register File: Modern GPUs may have a number of streaming multiprocessors (SMs) that each has its own register file, and a number of integer, floating point, and specialized computational cores. A GPU program (kernel) is decomposed into one or more cooperative thread arrays (CTAs, also known as thread blocks) that are scheduled to the SMs. The threads within a block are grouped together into warps, or wavefronts, typically of size 32. The threads within a warp execute together following a single instruction multiple thread programming model (SIMT). Each warp is assigned to a warp scheduler that issues instructions from its ready warps to the operand collection unit (OC) and then GPU computational cores.

Each warp has its own set of dedicated architectural registers indexed by the warp index. There is a one-to-one mapping between architectural registers and physical registers. To provide large bandwidth without the complexity of providing a large number of ports, the register file is constructed with multiple single ported register banks that operate in parallel. A banked design allows multiple concurrent operations provided that they target different banks. When multiple operations target registers in the same bank, a bank conflict occurs and the operations are serialized.

Figure 1:
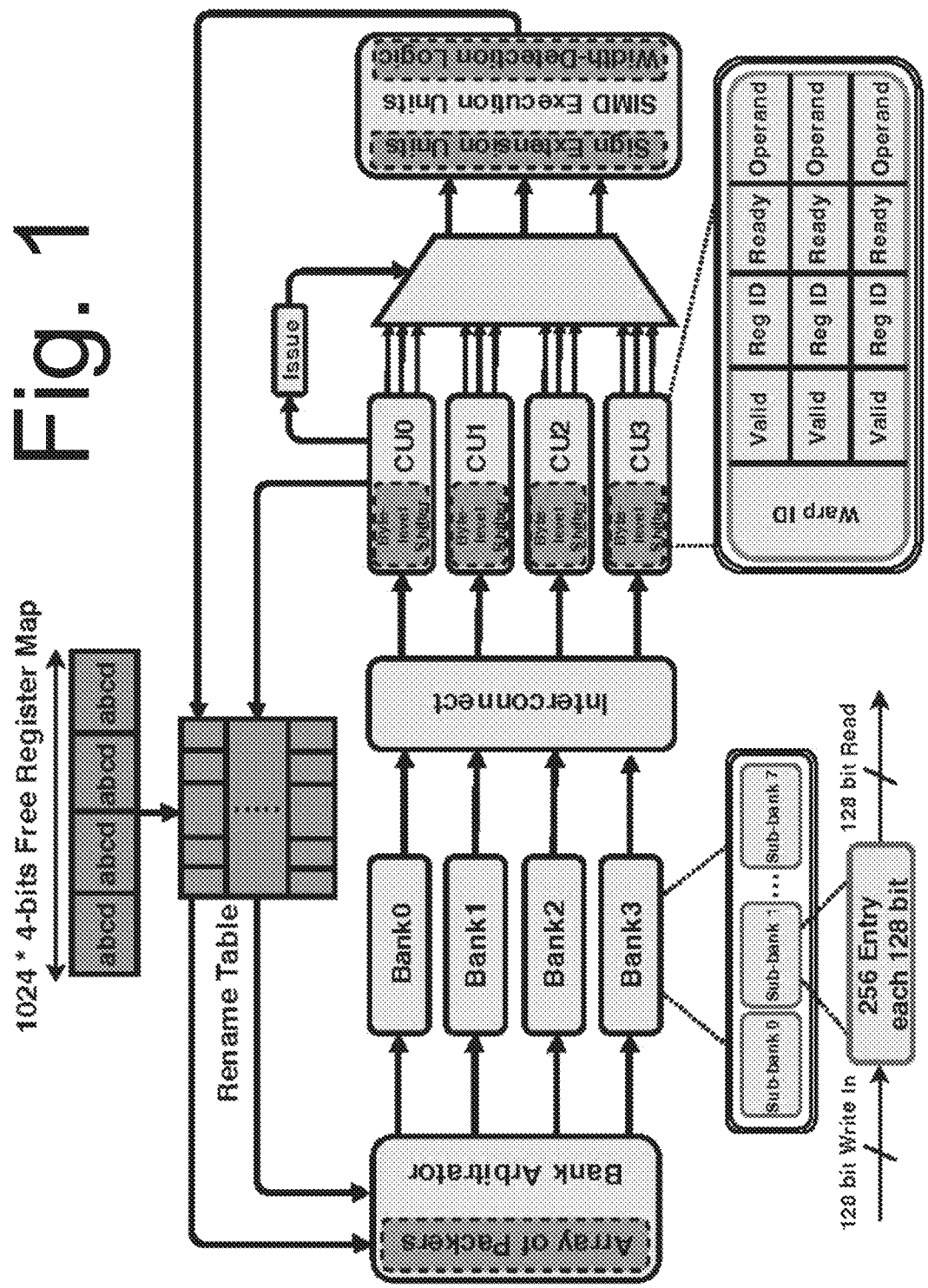
FIG. 1 illustrates an example a baseline Register File (RF) organization in accordance with some implementations of the disclosure.

FIG. 1 shows the baseline register file organization for the Fermi generation of Nvidia® GPUs. It has a register file size of 128 KB per SM, split across four banks. A bank is made up of 8 sub-banks that are each 128-bits wide. All 32 registers belonging to the 32 threads in the same warp are statically allocated to consecutive sub-banks (in a single bank) with the same entry index. Thus, a full register for all the threads within a warp can be striped using one entry of one bank, allowing it to be operated on in a single cycle. Each bank can store up to 256 warp-registers.

Impact of Register File on Performance and Power: In one embodiment, when a warp instruction is scheduled by the warp scheduler, an operand collector (OC) unit is assigned to collect its operands for execution. An OC fetches the register operands from the register banks they reside in subject to the two following constraints: (1) OC port serialization: each OC has only one port and therefore it has to serialize reads when an instruction has multiple operands (instructions may need up to 3 operands); and (2) Register bank conflicts: while operands from different banks may be concurrently read from different OCs, operands that access the same bank cause bank conflicts and cannot be issued together. The port constraints causing these conflicts are difficult to bypass by increasing the number of ports: the cost of a port is extremely high when considering the width of a warp register. Register coalescing can help with both of these constraints: by coalescing operands, it allows multiple operands to be read by an OC in a single cycle, overcoming port serialization. Moreover, by reducing the overall number of register reads, the pressure on the register file is reduced, reducing register bank conflicts. By reducing the overall number of reads to the RF, energy efficiency is improved. Moreover, improving performance leads to shorter run times, also improving energy efficiency.

Register Packing: Register coalescing opportunities arise when two registers needed by the same instruction are stored in the same physical register entry. This opportunity exists when the system allows multiple registers to be packed in the same physical register entry, called register packing. In particular, register packing maps narrow-width values (values which do not need all 32-bits to be represented) of multiple architectural registers to a single physical register. No prior register packing implementations in CPUs performs register coalescing, which is a new contribution of this system and method; instead, in other designs, each architectural register read requires a separate uncoalesced physical register read.

Because they do not use coalescing, prior register implementations utilize a greedy first-fit allocation policy to pack registers. This simple policy is sufficient to achieve the main goal of register packing to reduce the effective register file size; enabling unused registers to be power gated, or enabling the register file to be provisioned with a smaller number of physical registers. However, as discussed below, this policy leads to very few register coalescing opportunities. Thus, the system and method implement register coalescing to pack related registers that are frequently read together, which is a feature of the compiler analysis.

The Virtues of Register Coalescing

Register coalescing was tested with design coalescing-aware register files to maximize the benefits of register coalescing. Experiments were collected with GPGPU-Sim simulator, modeling a Fermi GPU. Benchmarks from Rodinia 2.2 were utilized, as well as Parboil, NVIDIA CUDA SDK, and Tango DNN Benchmark Suite.

Figure 2:
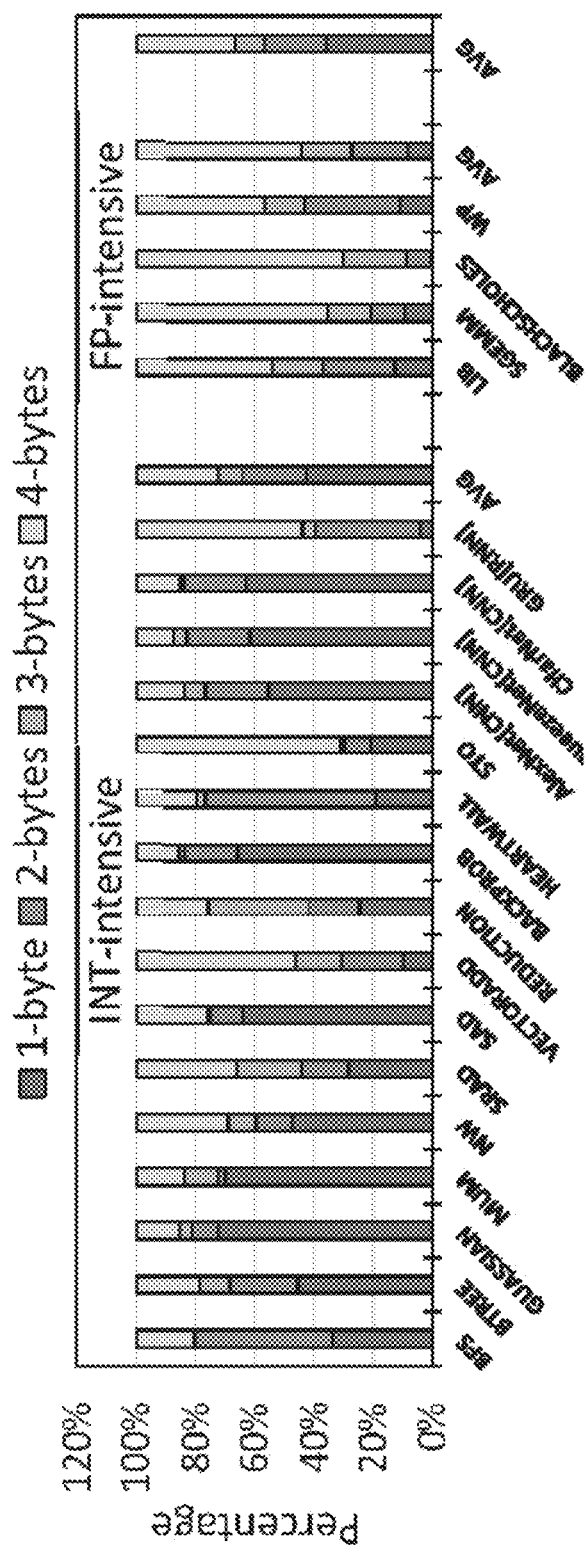
FIG. 2 is a graph illustrating the width distribution of registers accessed from the RF.

Register Operand Characteristics: FIG. 2 shows the prominence of narrow-width values in GPU applications. Narrow-width values are classified into four size classes: 1 byte, 2 bytes, 3 bytes, and 4 bytes (full-width). On average, 65% of all register operations contain narrow-width values, with over 33% of operations consuming no more than a single byte. This demonstrates that there exists a significant amount of register operands that is amenable to register coalescing. For floating point (FP)-intensive benchmarks (such as sgemm and blackscholes), the percentage of narrow-width values is less than that for integer-intensive benchmarks (such as bfs and btree). This is due to the IEEE 754 encoding of floating point values, which makes use of all 32-bits.

Figure 3:
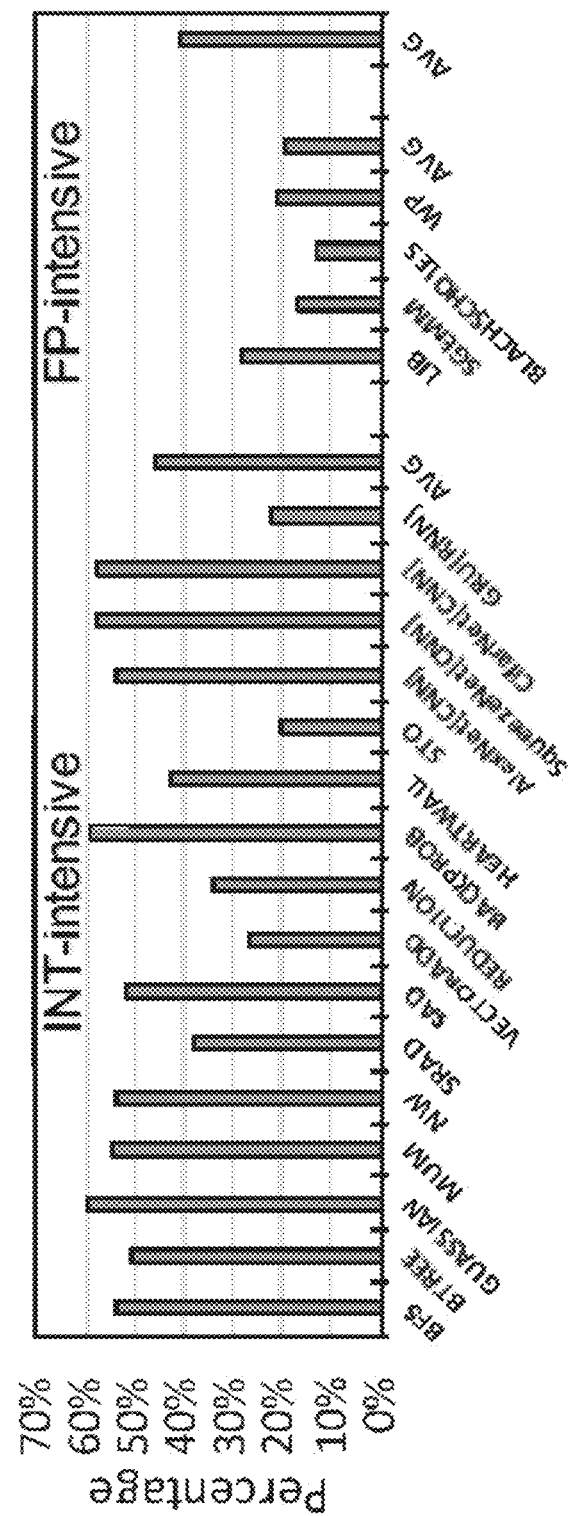
FIG. 3 is a graph illustrating unused RF bandwidth proportional to wasted dynamic energy.

Opportunity—Register File Bandwidth: FIG. 3 shows the unused register file bandwidth due to carrying the un-needed bits of narrow-width values. In addition to wasting bandwidth, these unneeded bits also cause wasted dynamic energy as they are unnecessarily carried through to the operand collector. There is more wasted bandwidth in integer applications since narrow width values are more common than in floating point applications.

While register packing is able to reduce the effective size of the register file, each register read still requires a separate physical register read. Therefore, this wasted bandwidth is not recovered with simple register packing. To this end, in one embodiment, the register coalescing reads multiple related registers used by the same instruction, through a single register read operation in order to more efficiently utilize the register file bandwidth.

Figure 4:
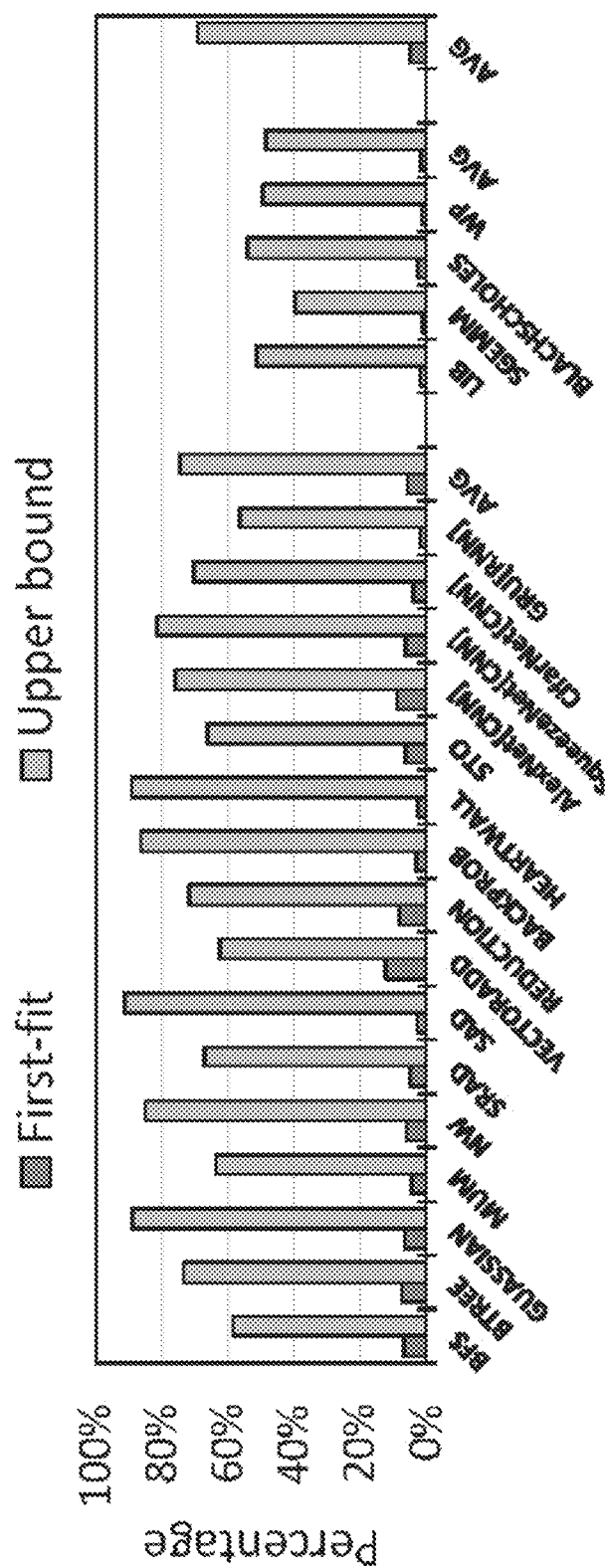
FIG. 4 is a graph illustrating the effect of instructions with coalescable register reads.

Register Coalescing Opportunity: FIG. 4 shows the prevalence of operand coalescing opportunities. The register operand values are profiled at run-time and measured are the fraction of all dynamic instructions, which contain two register source operands that are both narrow and can fit together in a single register entry. Instructions are considered that have two or more register source operands because they could benefit from coalescing. Around 40% of the instructions are found to have two or more register source operands, but more importantly, because they read multiple registers, they are responsible for over 70% of the register file reads. On average, 69% of all dynamic instructions with two or more operands have the potential for operand coalescing because their register operands can be packed, with up to 91% in some benchmarks like Sad and Gaussian. Clearly, there is more coalescing opportunities in integer intensive applications compared to floating point.

If register packing is extended to enable coalescing but the greedy first-fit register allocation policy is kept, the system can only leverage register coalescing opportunities in around 4% of instructions with two or more operands. This is a tiny fraction of the 69% of such instructions where a coalescing opportunity is potentially available! To improve coalescing opportunities, CORF incorporates a compiler-guided register allocation policy to identify pairs of registers commonly read from the same instruction and map them into the same physical register entry. In addition, in some embodiments, the system uses a coalescing-aware register file sub-bank organization and associated compiler-guided allocation policy (CORF++) which can coalesce register operands that are not stored in the same physical register entry, but in non-overlapping byte slices in the sub-bank.

CORF: Coalescing Operands in Register File

In this section, the design of CORF is discussed, which coalesces register reads to improve the RF performance and power consumption. For two reads to be coalescable, they are destined to registers that are packed in the same physical register entry. To improve the opportunity for coalescing, CORF utilizes compiler-assisted hints to pack related registers together. CORF is the first register file optimization technique that simultaneously improves performance and reduces power (both leakage and dynamic power). Coalescing enables higher performance by combining read operations, reducing operand collector unit port serialization, and register file port conflicts. It reduces dynamic power by decreasing the number of read operations to the register file and, because it leads to overall performance improvement, enables programs to finish faster lowering the overall energy consumption of the GPU. Latter described is CORF++, which further re-architects the register file organization to create more coalescing opportunities.

CORF Overview

Figure 5:
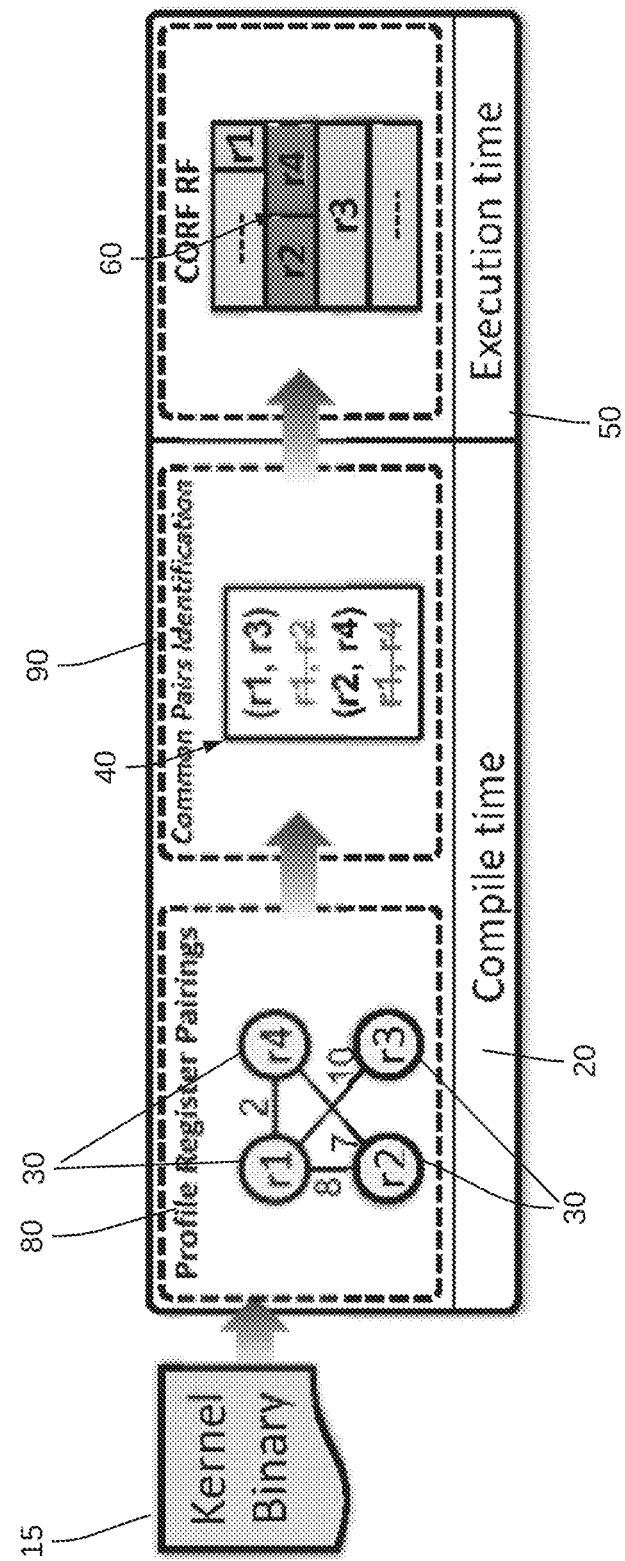
FIG. 5 is a flow diagram illustrating a CORF overview according to one embodiment.

Referring to FIG. 5, CORF identifies register pairs—registers that are used as source operands in the same instruction—at compile time 20 through static analysis or alternatively, profiling. For example, in FIG. 5, there are four registers 30 (r1, r2, r3, r4), where register r1 is read 8 times with r2, ten times with r3, and 2 times with r4. In this example, the system selects (r1, r3) and (r2, r4) as target exclusive common pairs for coalescing 40. During run-time 50, if any of these common pairs happen to be compatible narrow-width values, they will be dynamically packed together. If any instruction requires both r2 and r4 as source operands, the system can coalesce the operand access using a single read of the register file. However, in this example, during run-time 60 (r1, r3) could not be packed since their combined size exceeds the size of a physical register entry. Since each register can only be coalesced with at most one other register, the system would lose opportunities to coalesce operands from instructions with different register pairings, such as (r1, r2), a limitation that is resolved later in this disclosure.

Generating Compiler-Assisted Hints

Identifying Exclusive Common Pairs: Referring again to FIG. 5, the first step 80 in identifying common pairs is to profile the frequency of register pairings in order to build a register affinity graph, as shown in step 90. In order to determine the edge weights, the system tasks the compiler 20 to estimate the dynamic frequency of occurrence for each instruction in each kernel 15. This is, in general, a difficult problem at compile time 20, which is approximated as follows. For each instruction outside of a loop with two or more operands, the system considers every pair of operands to occur once. Inside of loops, if the loop iteration count is statically resolvable, the system uses that count to increment the edge weight for register pairs that occur in the loop. If the iteration count is not a resolvable constant, the system gives a fixed weight to each register pair in instructions inside the loop. The system uses the same approach for nested loops. While these weights are not exact, they serve as a heuristic to assign relative importance to register pairs.

In order to identify exclusive common pairs, the system removes edges of the registers that have more than one edge. Considering only registers with more than one edge, the system repeatedly removes the edge with the least weight until the system ends up with only exclusive pairs of registers. If there are any pair of registers that have all of their edges removed, the system checks if an edge can be restored between them.

Passing Compiler-Assisted Hints to Hardware: Referring again to FIG. 5, the set of exclusive register pairs that are identified by the compiler 20 are annotated in the executable's 50 preamble of a kernel and delivered to the hardware through a metadata instruction. The register pair information is maintained in a small associative structure. Specifically, the system may use a 64-bit metadata instruction (to be aligned with existing SASS binaries) in the beginning of each kernel 15 in order to carry the compiler hints to the hardware. Consistent with the SASS instruction set that uses 10 bits as opcode for each instruction, the system reserves 10 bits as opcode and the remaining bits for storing the common pairs of the registers. Since in Fermi architecture, each thread may have up to 63 registers, some embodiments may use 6-bit as the register number. Each metadata instruction can carry up to four common pairs. Multiple instructions are used if more than 4 pairs need to be communicated. This design can also be adapted to support newer GPUs with more registers.

CORF Run-Time Operation

The description of CORF is completed by explaining how registers are allocated to control the allocation of compiler identified pairs. Also described are how coalescing opportunities are identified.

CORF Register Allocation Policy: The register allocation policy for CORF attempts to pack the identified register pairs into the same physical register entry to increase coalescing opportunities. A register is allocated for the first time it appears as the destination of an instruction. Additionally, it could be reallocated when its size changes. When an allocation event occurs, the system checks the register pair information to see if the register belongs to a common pair. If it does, the allocator uses the common pair allocation logic. If the register does not belong to a common pair, it is allocated using the default allocation policy (which is assumed to be first-fit). To illustrate the common pair allocation using an example, assume that r1 and r2 are identified as a common pair. When the first operand (say r1) arrives and is to be allocated, it is identified as a common pair register and mapped to any free full-width physical register. The rationale is to reserve any remaining slices of the physical register for a future allocation of the other register in the pair. When the buddy register (the register complementing the pair, which is r2 in this example) is allocated, the system checks to see if it fits the physical availability in the register allocated to r1. If it fits, it is allocated to the same physical register. If r2 does not fit, then it is mapped using the default policy.

Figure 6:
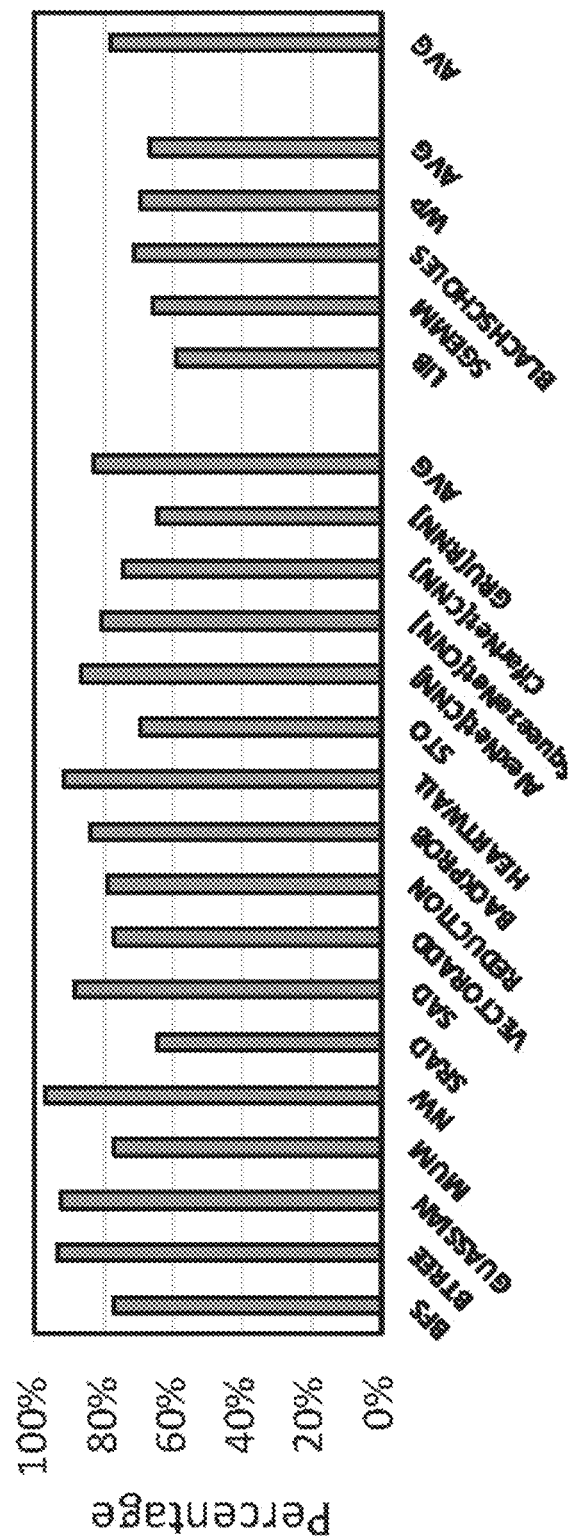
FIG. 6 is a graph illustrating the percentage of successful combinations of compiler identified register pairs for CORF.

In FIG. 6, it is shown in the graph that identified common pairs fit together, and are successfully packed in the same register, in most of the cases (an average of just under 80%). This is a high percentage despite the fact that there is no size estimation in the compiler analysis.

Identifying Coalescing Opportunities: Recall that packing registers in the same physical register is enabled by a renaming table (RT) that maps the architectural register to the physical register slice where it is stored. The RT is indexed by a tuple of the warp id and an architectural register number. Each physical register is split into four 1-byte slices. Thus, each RT entry stores the physical register where this value is stored, and a 4-bit vector called the allocation mask, which specifies the bytes in the physical register that the potentially narrow architectural register resides in. The system uses a free register map to keep track of free allocations of physical register slices when making allocation decisions. The free register map is a bit vector with each bit representing a byte of one of the physical registers (i.e., 4-bits per physical register).

To identify coalescing opportunities as a new instruction is sent to an operand collector unit, the system first looks up the renaming table to determine the physical registers where the operand registers are stored. If the physical registers for two operands match, the reads to these operands are coalesced into a single read to the register file. When the physical register contents are received, the unpacker demultiplexes the two registers and sign extend them to recover two full-length registers.

Incorporating Register Virtualization: CORF's implementation seamlessly supports register file virtualization to further reduce the size of the register file. Specifically, register file virtualization, which releases registers when they are no longer live, can also further reduce the register file size. At the same time, it can be directly supported within CORF since it also relies on a renaming table to allocate registers, requiring almost no additional overhead.

CORF++: Re-Architected Register File

CORF coalescing opportunities may be limited to registers stored within the same physical register entry. If a register is commonly accessed with two or more other registers, coalescing is possible with only one of them. To relax this limitation, CORF++ reorganizes the register file to enable more operand coalescing opportunities.

Figure 8:
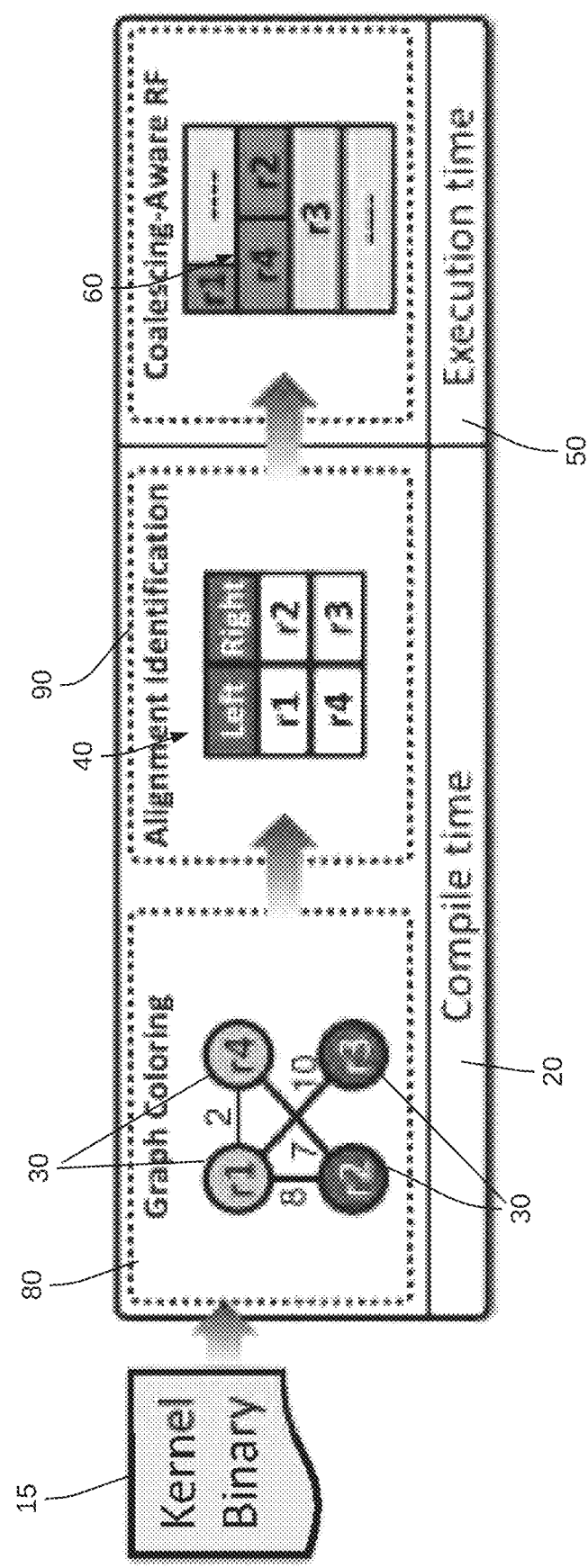
FIG. 8 is a flow diagram illustrating a CORF++ Overview.

Specifically, CORF++, an exemplary flow and structure of which is shown in FIG. 8, re-architects the register file to enable coalescing of registers within the same physical register bank, provided they reside in non-overlapping sub-banks. Recall that each bank consists of eight 16-Byte wide sub-banks. Since the system is no longer restricted to coalescing exclusive pairs of registers packed into the same physical register entry, the compiler's task of guiding register allocation to promote coalescing becomes substantially different. In this section, presented is an overview of CORF++. The compiler support to optimize coalescing opportunities in CORF++ is presented, then described is the implementation of the coalescing aware register file, and finally discuss its operation during run-time.

Compiler-Assisted Register Allocation

CORF++ allows coalescing registers in non-overlapping sub-banks, even if the values reside in two different physical register entries. The main challenge of efficient register allocation in CORF++ is in assigning commonly read register pairs in different sub-banks. In one embodiment, the system simplifies the allocation to a selection of left-aligning and right-aligning assignments; provided that two registers are in separate alignments, they have a chance of being coalesced (subject to their combined size being smaller or equal to 4 bytes).

Similar to the compiler analysis for CORF, in step 80 of FIG. 8, the system starts by constructing the register affinity graph where edges between registers 30 ($r_n$) indicate the expected frequency of reading the two registers 30 together in the same instruction. An optimal assignment maximizes the weight of the edges between registers assigned to alternate alignments. This problem maps to a graph coloring problem variation (step 80) (where each alignment is a color). The system is attempting to remove the minimum edge weight (thus, forsaking the least coalescing opportunities) to enable the graph to be colorable by two colors (left or right). This variation of graph coloring is called the bipartite frustration problem, and is NP-hard even with two colors.

Figure 7:
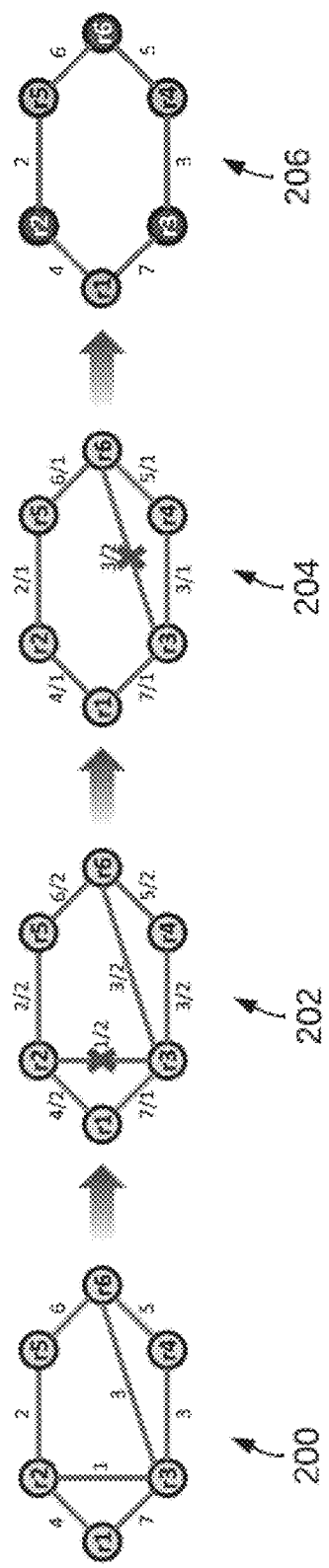
FIG. 7 is a flow diagram illustrating a CORF++ register assignment heuristic Example.

To derive an efficient heuristic for register mapping, first observed is that any graph with no odd cycles (cycles made up of an odd number of edges) is 2-colorable. Thus, to solve the problem, the system removes the minimum set of edges, considering weight, that will break all odd cycles. Since the optimal solution is NP-hard, developed is the following heuristic, as illustrated in the flow diagram of FIG. 7. In step 200, in the initial graph state (left-most graph), there are three odd cycles: (r1, r2, r3), (r3, r4, r6), and (r1, r3, r6, r5, r2). In step 202, the system assigns each edge a weight corresponding to its original weight, divided by the number of odd cycles that removing it would break. In step 204, the system then removes the edge with the minimum weight (among the edges that are part of odd cycles), and updates the weights. In step 206, the system repeats this process until all odd cycles are eliminated, enabling us to trivially 2-color the graph.

Similar to CORF, the register allocation information is passed through metadata instructions. The system may use a metadata instruction to encode the assignment of registers to alignment as either left, right, or don't care. This encoded data is expanded to store 2 bits per register to indicate alignment. This data is stored using a single bit-vector for each kernel resulting in a storage overhead of 128 bits per kernel. Other designs that reduce or completely remove this overhead are possible, for example, having the compiler assign registers in a way that encode alignment (e.g., all even registers right aligned).

Coalescing-Aware Register File Organization

Figure 9:
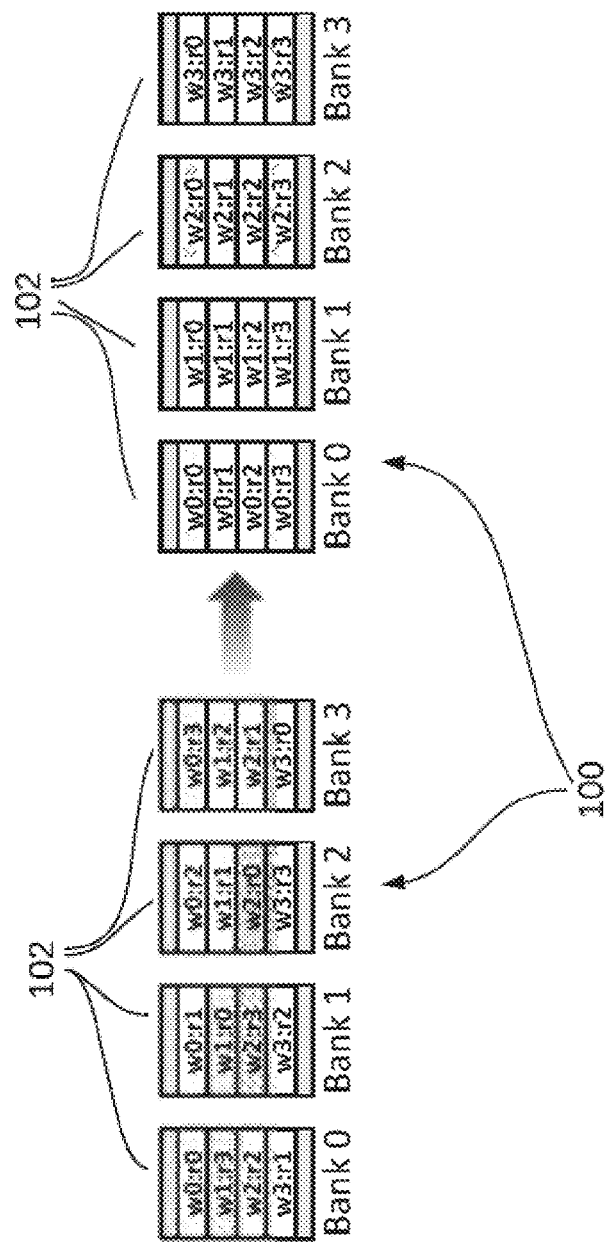
FIG. 9 is a diagrammatic view of a modified register-to-bank mapping where all registers belonging to a warp maps to the same bank.

Mapping Registers to Banks: With reference to FIG. 9, in the baseline register file 100, registers belonging to the same warp are interleaved across the register banks 102 with the goal of minimizing bank conflicts across warps (FIG. 9, left side). Since coalescing occurs only within a single instruction of a warp, CORF++ maps all registers belonging to the same warp to a single register bank in order to maximize coalescing opportunities (FIG. 9, right side). This new mapping ensures that all accesses to registers within the same warp are in the same bank and therefore potentially coalescable.

Counter-intuitively, the goal is to create more bank conflicts within warps, which gives more opportunities to convert bank conflicts into beneficial coalescing opportunities. Note that, in one embodiment, since the operand Collector unit can read no more than one register in each cycle, there is no lost opportunity in terms of reading registers from different banks for the same instruction. With respect to conflicts across warps $w_n$, on average, the new mapping does not increase conflicts since the probability of two registers from two different warps being in the same bank remains n where n is the number of banks 102. However, with the new mapping, two warps either always conflict (because they are mapped to the same bank) or they never do (because they are mapped to different banks) and there is a possibility for pathologies arising, for example, from two active warps being mapped to the same bank. However, tests did not show any such behavior during experiments.

Sub-bank Organization: CORF++ allows multiple read operations to registers that reside in non-overlapping sub-banks to be coalesced. To support this functionality, the system changes the mapping of the registers to sub-banks. For clarity, the system may define the bytes of a 32-bit register values as $B_3B_2B_1B_0$.

Figure 10:
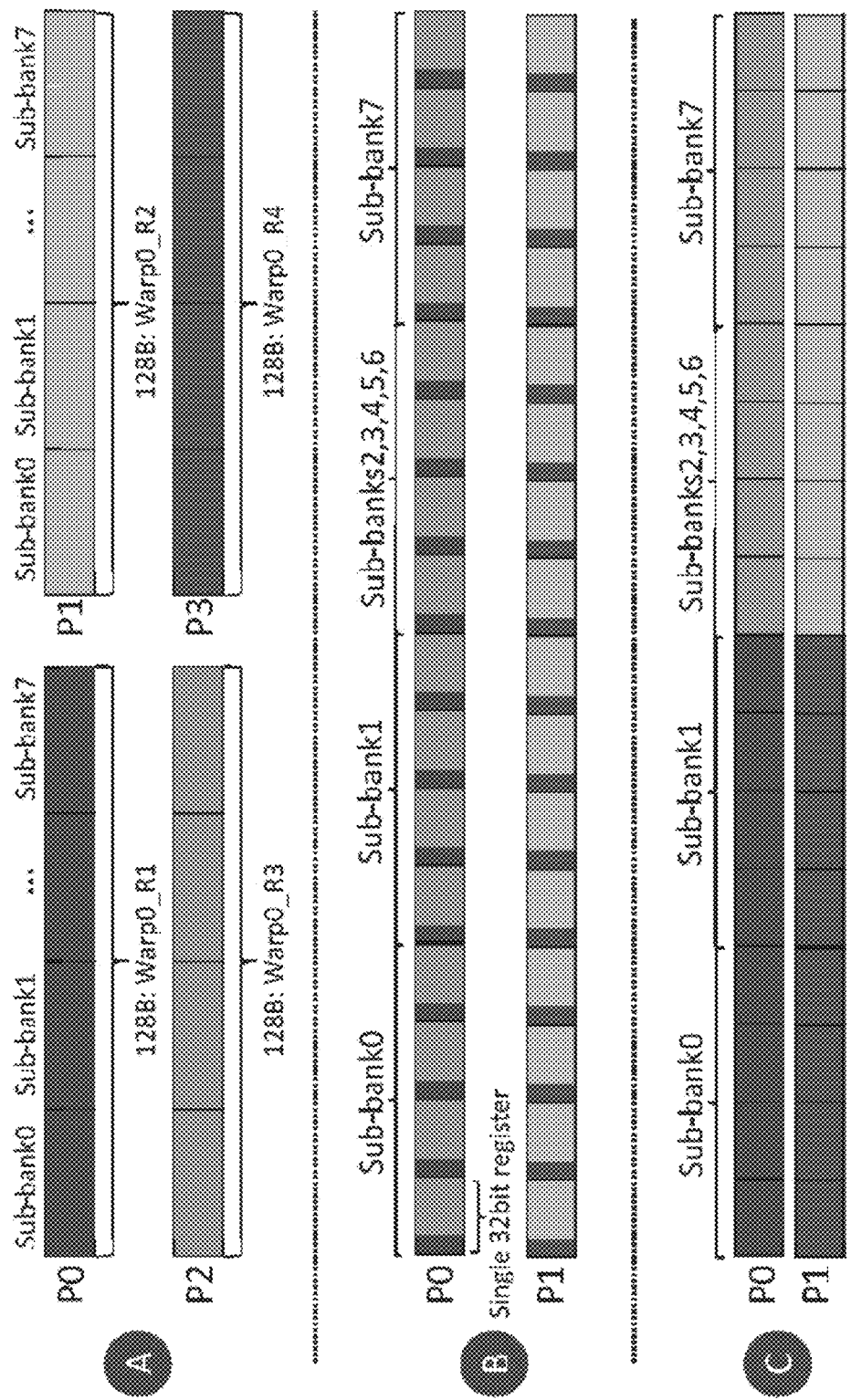
FIG. 10 is a diagram of a baseline register sub-bank organization.

In FIG. 10, a diagram shows how registers are organized across the 8 sub-banks in current GPUs. A register is stored across all 8 sub-banks, where each sub-bank is 128-bits wide. Each sub-bank stores a 32-bit register value for 4 threads. For example, sub-bank 0 stores the register values for threads 0-3 in sequential order, where the first 4 contiguous bytes are from thread 0, the next 4 bytes are from thread 1, and so on.

As an example, assume that r1 and r4 are narrow-values of size 1-byte, and r2 and r3 are narrow-values of size 3-bytes. B in FIG. 10 shows how these four architectural registers are stored after they are packed into two physical registers. For example, in physical register P0, r1 and r3 are packed together. In this example, since r3 is of size 3-bytes, r3 will only utilize the 3 least significant bytes ($B_{2-0}$). This mapping leaves the most significant byte ($B_3$) available, which is packed with r1. r2 and r4 are also packed similarly. In this scenario, the system can only coalesce reads if they require r1 and r3, or r2 and r4, as these pairs reside in the same physical register entry. In this case, the system loses coalescing opportunities for other compatible pairs, such as r1 and r2, or r3 and r4 since parts of every register are spread across all sub-banks.

To address this limitation, the system provides a reorganized sub-bank mapping, as shown in C of FIG. 10. Instead of storing registers in sequential ordering of the entire 32-bit register value, the system will instead interleave the storage of register values across the sub-banks. In this scenario, the system first stores the most significant bytes ($B_3$) of threads 0-31 consecutively, then stores the next significant bytes ($B_2$) of threads 0-31, etc. In this organization, $B_3$ is stored in sub-bank 0 and 1, $B_2$ is stored in sub-bank 2 and 3, and so on.

When storing packed values in CORF++, the system stores the narrow registers as either left-aligning, or right-aligning. In the case of r1 and r3, r1 is stored into P0 as left-aligning, and r3 is stored as right-aligning. In this new sub-bank organization, the system is able to coalesce r1 and r3, and r2 and r4. Note that if each sub-bank can address different physical register addresses, then it would also be possible to coalesce registers in non-overlapping sub-banks. For example, r1 and r2, and r3 and r4 would be coalescable.

Figure 11:
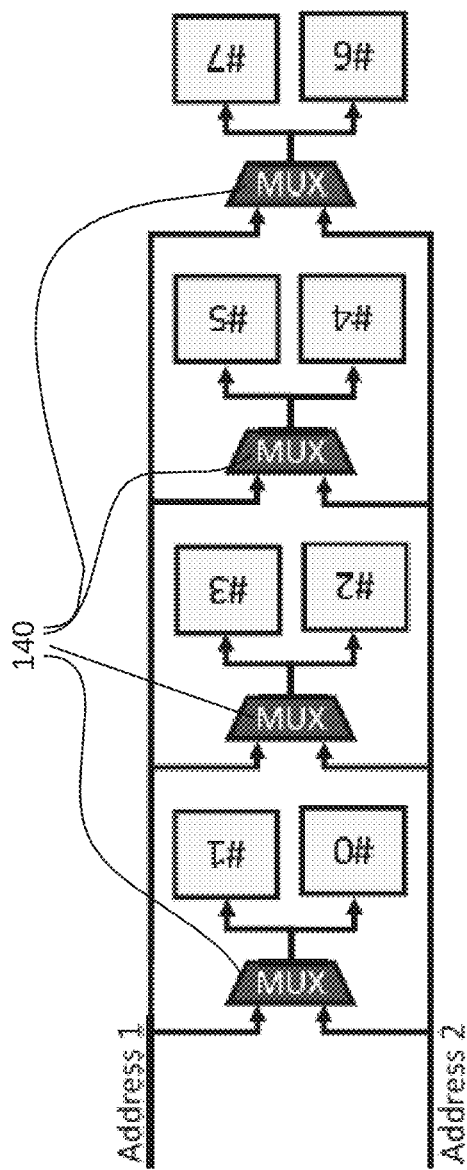
FIG. 11 is a diagram illustrating a structure of a dual address register file.

Dual-addressable Banks: To support coalescing across different physical register entries, the system uses dual-addressable banks as shown in FIG. 11. The system may include additional MUXes 140 to pick between Address1 or Address2 which represent a left aligning and a right aligning register being coalesced. If the system is to coalesce r1 and r2, then P1 would be sent to Address1 and P0 would be sent to Address2. By default, the MUXes 140 select Address1, and utilize the 4-bit allocation mask from Address2's entry in the renaming table as the selector. In this scenario, the system uses r1's allocation mask, which would be 1000.

CORF++ Run-Time Operation

Next, is explained the run-time operation of CORF++ through an illustrative example to demonstrate register allocation and coalescing.

CORF++ Register Allocation: When an allocation event occurs (e.g., writing into r2 in step C in FIG. 12), the system checks the register alignment to see if it is a right-aligned or left-aligned register. For don't-care registers, the system defaults to the first-fit allocation.

Identifying Coalescing Opportunities: Similar to CORF, to identify coalescing opportunities as a new instruction is sent to an Operand Collector unit, the system looks up the allocation mask in the renaming table for the source operands. Any two source operands could be coalesced if the AND of their allocation masks becomes 0000.

Figure 12:
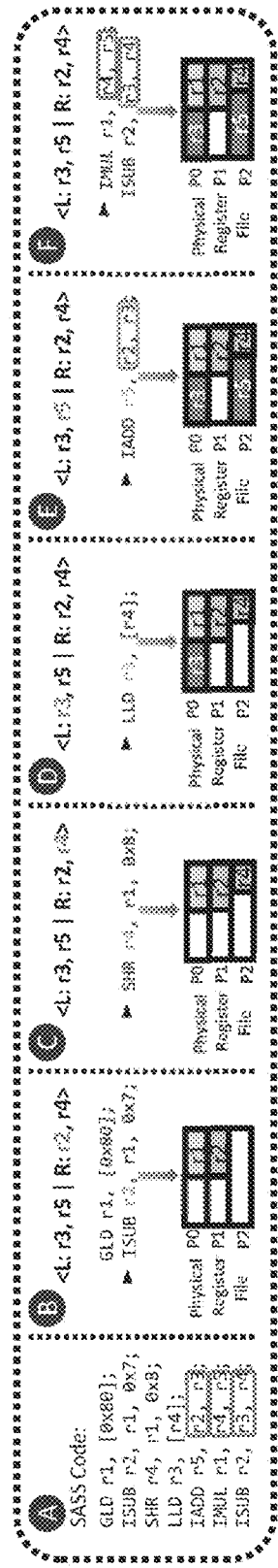
FIG. 12 is a flow diagram of an illustrative example of CORF++ register allocation and read coalescing.

FIG. 12 shows flow diagram in an illustrative example of CORF++ with three physical registers. Step A shows a piece of SASS code that is executed. The value that is loaded in r1 in step B is detected by a width detection unit as a narrow-width value that needs 2 bytes, and since r1 is an unallocated don't-care register, the system maps it to the first available spot (using first fit policy). The next instruction writes into r2 which is right aligned, so the system maps it to the first available right part of a physical register. In step C the instruction writes into r4 and is allocated to the first available right part of a physical register. Step D is a local load into r3, so the system maps it to the first available left spot (which is P0). In step E, the system first coalesces the read operation for r2 and r3 and then writes into r5, so the allocator maps it to the first available left spot. Finally, in step F, CORF++ coalesces the read operations for r4 and r5 and later r3 and r4. In this example, the system was able to coalesce all available opportunities. In contrast, CORF is not able to coalesce the read operations for r3 and r4 because it would only be able to pick exclusive common pairs.

Additional Implementation Details

CORF assumes as a starting point a register file that implements register packing RF and may extend it in three important ways: (1) It supports operand coalescing: the ability to identify opportunities for reading registers that are packed in the same physical register (CORF) or in mutually exclusive sub-banks (CORF++), and the support to read them together and unpack them; (2) It receives compiler hints to guide register allocation decisions and uses them to guide allocation to promote coalescing; and (3) It also supports register virtualization, allowing it to free registers when they cease to be live. Additionally, CORF++ rearchitects the register file to enable coalescing reads from mutually exclusive sub-banks as described in the previous section. In this section, additional important components of CORF and CORF++ are described.

Renaming Table (RT): The renaming table is a table indexed by a tuple of the warp id and an architectural register number. Each entry stores the physical register where this value is stored, and a 4-bit allocation mask. The table consists of (max_num_of_warps_per_SM× max_regs_per_thread) entry, which is 48×63=3024 in the reference register file. Each entry has a width of 14 bits (10 bits to represent the physical register number, and the 4-bit allocation mask).

The renaming table may be accessed on register reads to resolve the mapping to the physical register. In one embodiment, the number of ports needed at least matches the number of read-ports on the register file to keep port-conflicts from becoming a bottleneck. The renaming table can be implemented as a general multi-ported table. However, to reduce complexity, the system implements it as a dual ported sub-banked structure. It uses two ports to allow fast lookup of potentially coalescable registers. It may use a design with a separate bank for each register file bank in the corresponding register file.

Allocation Unit: A small structure that guides the allocation policy using information provided by the compiler may be used. It holds an allocation vector that carries the alignment for each register (left, right or don't care). It stores 128 bits per each kernel (although tests rarely observed more than 30 registers per kernel), for a maximum storage size of 128 bytes per SM (please note that there may be up to 8 concurrent kernels running on each SM). The allocation vector is consulted during allocation in conjunction with a free map that keeps track of the available physical registers (and register slices). The allocator logic uses the alignment preference as it consults the free map to identify a target register for allocation. Note that the renaming logic, free map, and the allocation logic are present in baseline register packing; the allocation unit adds the compiler hints and changes the allocation logic to use them.

Impact on Pipeline: Although the RT access latency is low (0.38 ns according to CACTI, which is well below the cycle time of modern GPUs), the system may avoid combining the RT lookup, coalescing logic, and the register file read in the same cycle. It is noted that once the scoreboard marks an instruction to be ready to issue it needs at least one cycle to find a free operand collector and move the instruction to it. Thus, it uses this cycle to initiate access to the renaming table to avoid trying to fit the renaming table access and the register file access in the same cycle. The RT is dual ported and sub-banked; however, in the event of a port conflict, the arbitrator (which resolves conflicts for the register file) is extended to delay the register read while the remaining table read is resolved. The test had an extended pipeline in the simulator to model these effects.

Control Divergence: When control divergence occurs, only a subset of SIMT lanes of a warp are active. CORF operation continues unchanged under divergence but considering all registers (whether belonging to active or inactive threads) for all operations (importantly for width determination).

Size Changes: If a packed narrow-value register size increases during runtime, the system may simply reassign it to another physical register entry using the same process as the initial assignment. The original mapping is then cleared. Size change events which require reallocation are rare (less than 0.3% of writes), which makes these extra accesses to the RT have negligible effects. In case of a size decrease, the system may keep the old mapping and adjust only the size in the renaming table.

Packers and Unpackers: Packers and unpackers are placed as shown in FIG. 1 so that packed values only exist in the register file and operand collection pipeline stage. Registers are packed as they are written to the register file by first aligning them into the slice they will be written to, and writing only that slice of the physical register. Conversely, when registers are read, they are unpacked by shifting down (if necessary) and sign extending such that the registers are recovered to full width. The unpackers are designed to be able to unpack two values in the case of coalesced reads. The number of packers required matches the pipeline width for writing (in our case, two packers). To unpack coalesced registers, the system may have two unpackers working in parallel in each operand collector, for a total of 8 unpackers per SM.

Width Detection Units: The register width detection units are embedded into the final stage of SIMD execution units in order to detect the width of produced outputs. This is a combinational circuit: it ORs the 7 least significant bits for each of the three most significant bytes for every register in addition to the most significant bit of the byte before it (to ensure that narrow positive numbers always start with a 0 in the MSB). For example, for byte 1 which spans bits 8 to 15, the system ORs bits 7 to 14 to identify whether the byte is 0 or not. This produces a 3-bit output for each register. Moreover, another 3 bits are obtained by NAND'ing together the same bits of each byte to track the width of negative numbers. Again, this ensures that any shortened negative number has 1 in the MSB. The system uses the most significant bit of the register to multiplex out either the OR outputs (for positive values) or the NAND outputs (for negative values). A second stage ORs the 3 bits output of the MUX per register across all 32 registers in the warp producing a single 3-bit output to capture the maximum width. This 3-bit sequence is used to determine the overall size of the register.

Performance and Power Evaluation

The system was implemented for CORF and CORF++ in the GPGPU-Sim v3.2.1 platform, based on a Nvidia Fermi-like GPU configuration with 15 SMs. Each SM has a 128 KB register file organized into four banks, and each bank consists of eight sub-banks, as detailed in FIG. 1. PTXPlus was enabled for all evaluations. Since GPGPU-Sim provides a detailed PTX code parser, the parser to carry out our compiler optimizations was modified. Each SM also has two warp schedulers configured to use a two-level warp scheduler.

In all experiments, 20 benchmarks were used selected from the Rodinia, Parboil, NVIDIA CUDA SDK, and Tango benchmark suites. These benchmarks cover a wide range of behaviors and operand mixes (integer/floating point).

Figure 13:
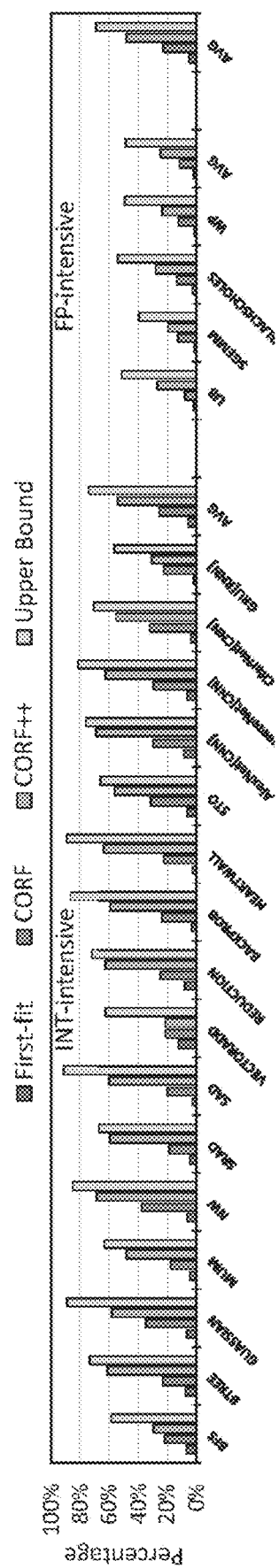
FIG. 13 is a graph illustrating that coalesced instructions, showing that CORF and CORF++ significantly increases the amount of coalescing opportunities.
Figure 14:
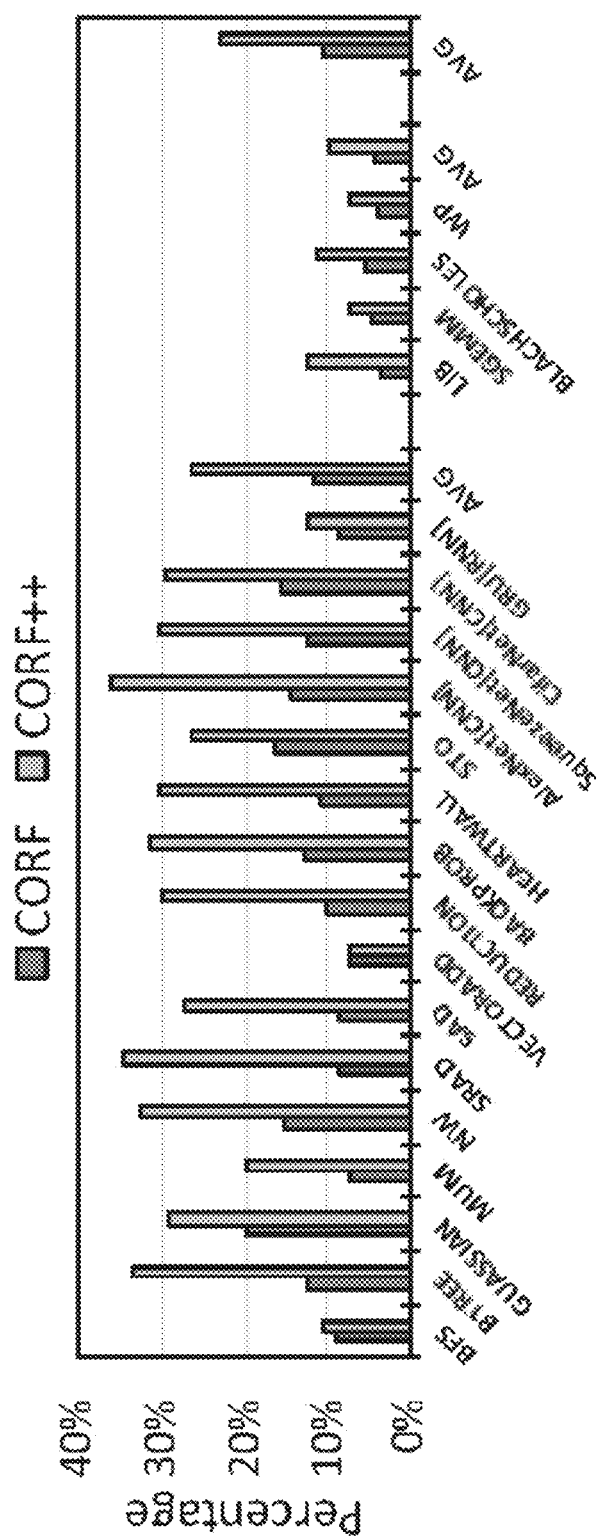
FIG. 14 is a graph illustrating the reduction in the number of accesses to the register file.

Coalescing Success: FIG. 14 shows the reduction in register file accesses due to operand coalescing in CORF and CORF++. CORF reduces the overall number of register file accesses, by 12% for integer applications, 4.5% for floating point applications, and 10% of all applications. This reduction percentage is computed against all accesses (including writes, and instructions with a single register operand, which cannot be coalesced). CORF++ is able to reduce even more accesses (by 2.3×) because of increased coalescing opportunities. Specifically, CORF++ reduces register access of integer applications by 27%, floating point applications by 9.9%, and 23% overall. FIG. 13 shows the impact of compiler optimizations on the success of coalescing. While first-fit allocation policy results in coalescing only 4% of the instructions with multiple register operands, CORF and CORF++ are able to coalesce 23% and 48%, respectively.

Figure 15:
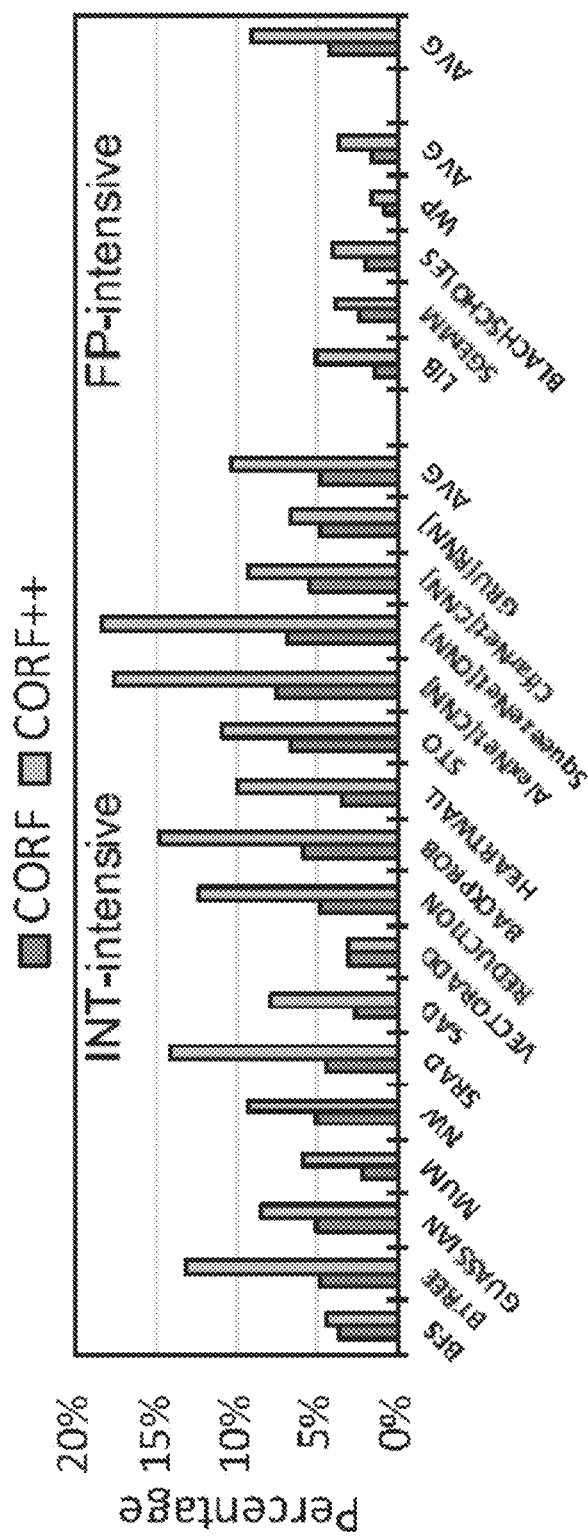
FIG. 15 is a graph illustrating the IPC improvement using embodiments of the system.

Performance: As a result of the reduced register accesses, performance is improved. FIG. 15 shows the performance impact of CORF and CORF++. Notably, IPC improvement is observed across all benchmarks. On average, CORF improves IPC by 4.9% for integer benchmarks and 1.7% for floating point benchmarks (harmonic mean across all applications is 4%). For fairness, the IPC computation does not count metadata instructions since they do not further the computation (but the cost is included). CORF++ is able to improve IPC for integer benchmarks by 10.5%, floating point ones by 3.6%, resulting in a harmonic mean of 9%.

Figure 16:
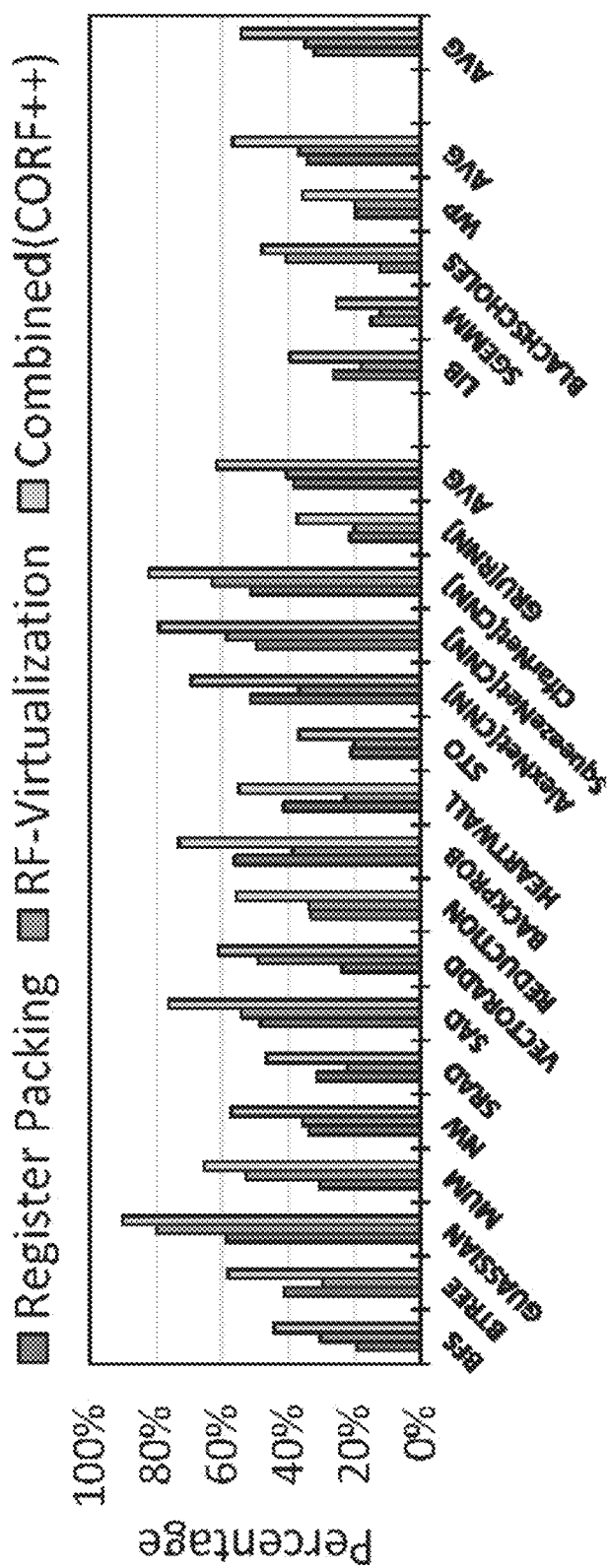
FIG. 16 is a graph illustrating the reduction in allocated physical registers using the embodiments of the system

Register File Size: A secondary contribution of CORF is that it combines register packing and register virtualization to reduce the overall register file size beyond either of these techniques alone. Virtualization is essentially obtained for free since it primarily relies on a renaming table. FIG. 16 shows the reduction in the number of allocated physical registers using register packing, register file virtualization (RF-Virtualization), and when combined together. The number of allocated physical registers was tracked (each potentially packing up to two architectural registers) as a fraction of the total number of architectural registers averaged over the benchmarks' execution. Register packing reduced physical-register allocation by 34%, register file virtualization alone reduced it by 35%, while both together reduced it by 54%. When combined, packing compresses spatially, and RF-Virtualization temporally, leading to synergistic improvements. This is the highest compression ratio achieved by techniques that attempt to compress the register file size. The reduction in effective register file size can be exploited either: (1) by gating unused registers to save power; (2) by reducing the register file size while maintaining performance; or (3) by enabling more threads to be active to improve performance. Demonstrated is the advantage using the first option.

Figure 17:
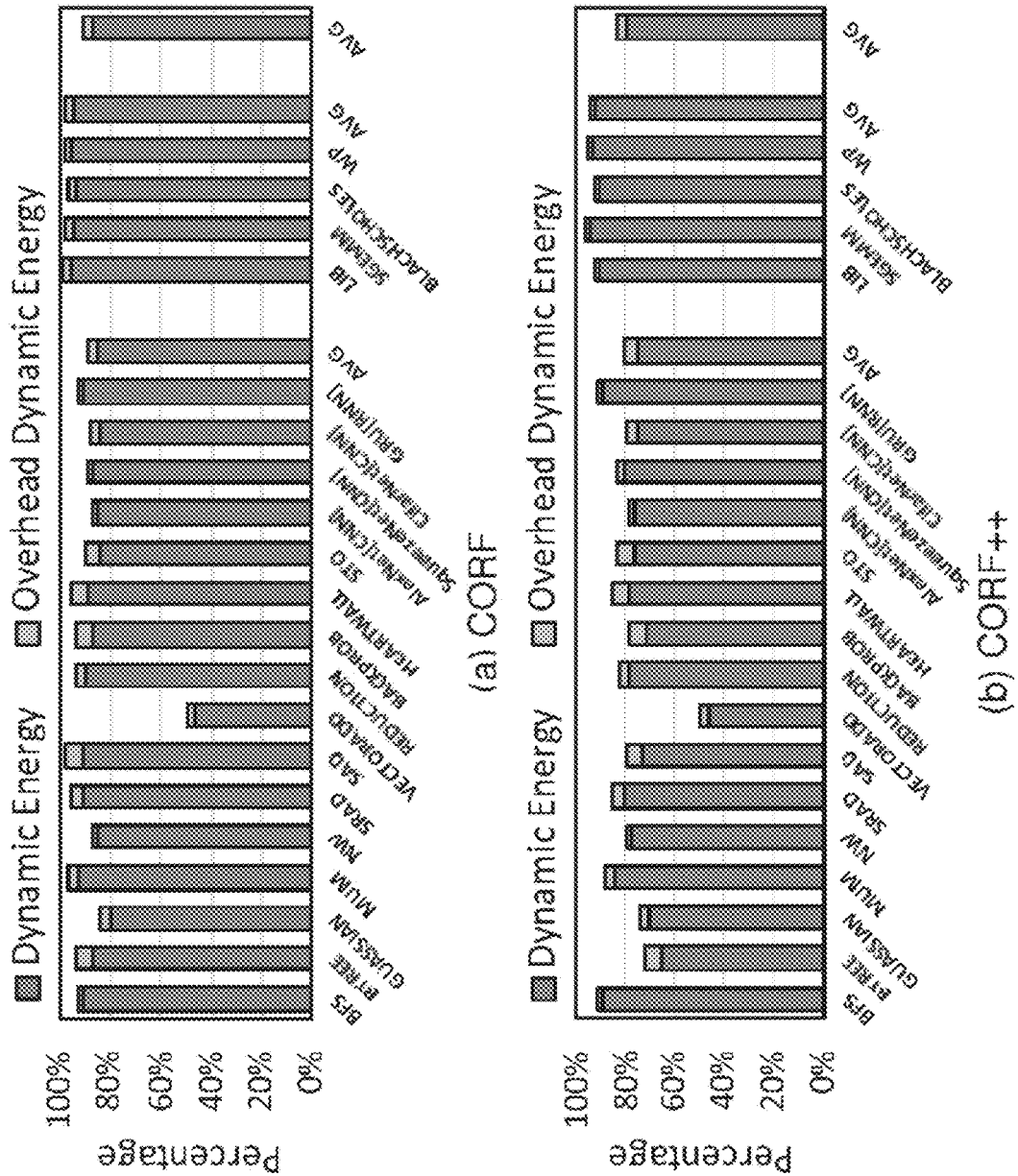
FIG. 17 is a graph that shows the dynamic energy and leakage energy impact of the system's methods.

RF Energy: FIGS. 17 and 18 show the dynamic energy and leakage energy impact of the system's methods described herein. The small segments on top of each bar represent the overheads of the structures added by CORF/CORF++. Dynamic energy savings in FIG. 17 are due to the reduced number of accesses to the register file because of operand coalescing. An 8.5% and 17% reduction to the overall dynamic energy in CORF and CORF++, respectively, was observed after considering the 3% increase in overheads. The source of dynamic energy overheads includes the packers and unpackers, width detection logic, and the accesses to the renaming table.

FIG. 18 shows the leakage energy for register packing and also the combined register packing and virtualization (CORF++), assuming that the system power gates unused registers. Leakage energy is reduced by 33% in register packing (FIG. 18a), and 52% for the combined with virtualization (CORF++, in FIG. 18(b)), after accounting for the overheads. On average, the leakage overhead, due to the additional structures such as the renaming table and the free-register map, is 5.4%, which is easily out-weighed by the leakage energy savings.

TABLE 1

Summary of CORF, CORF++, and register packing (and register virtualization). All values normalized to the baseline GPU register file.

| Technique | IPC | Register Reads | RF Dyn. Energy | RF Size |
|---|---|---|---|---|
| Register Packing | 1 | 1 | 1 | 0.65 |
| Register Packing + Virtualization | 1 | 1 | 1 | 0.43 |
| CORF | 1.04 | 0.9 | 0.92 | 0.43 |
| CORF++ | 1.09 | 0.77 | 0.83 | 0.43 |

The advantages of CORF/CORF++ compared to register files without coalescing are summarized in Table 1. Note that there is improvement in performance of register packing when a smaller effective register file to allow more threads to run concurrently per SM. This IPC improvement technique is orthogonal to coalescing and can be combined with it, so it is not in this comparison.

Hardware and Software Overheads

Hardware Overheads: The largest additional structure in CORF is the renaming table, which is also used for simple register packing. Each RT entry consists of 14 bits that encodes the physical register and slice to which an architectural register is being mapped. Since the baseline architecture supports up to 48 warps per an SM, and 63 registers per warp, for a total of just over 3000 potential warp architectural registers. Each register has an entry in the table. Therefore, RT total size is 5.16 KB which is 4% of total 128 KB register file per each SM. The free register map size is 1024×4-bits or 512 bytes. Supported by the RT, register packing and virtualization reduce the effective register file size to less than half its original size: the benefits of shrinking the register file easily offset the overhead, before coalescing is even considered. The renaming table and register file power consumption using CACTI v5.3 calculated and reported in Table 2.

TABLE 2

Remaining table overheads in 40 nm technology.

| Parameter | Renaming table | Register bank | Percentage |
|---|---|---|---|
| Size | 5 KB | 128 KB | 3.9% |
| # Banks | 4 | 4 | — |
| Vdd | 0.96 V | 0.96 V | — |
| Access energy | 1.83 pJ | 149.76 pJ | 1.2% |
| Leakage power | 5.56 mW | 89.6 mW | 6.2% |

The overhead of logic, such as the allocation policy logic, coalescing logic, packers, unpackers, and width detection units, was estimated by synthesizing its Verilog HDL description using Synopsys Design Compiler and the NCSU PDK 45 nm library. The static and dynamic energy of these logics are also included in the power results. All together, these logic accounts for 57 mW of dynamic power, 0.2 mW static power, and 0.05 mm$^2$ (or 0.11%) of total on chip area.

Figure 19:
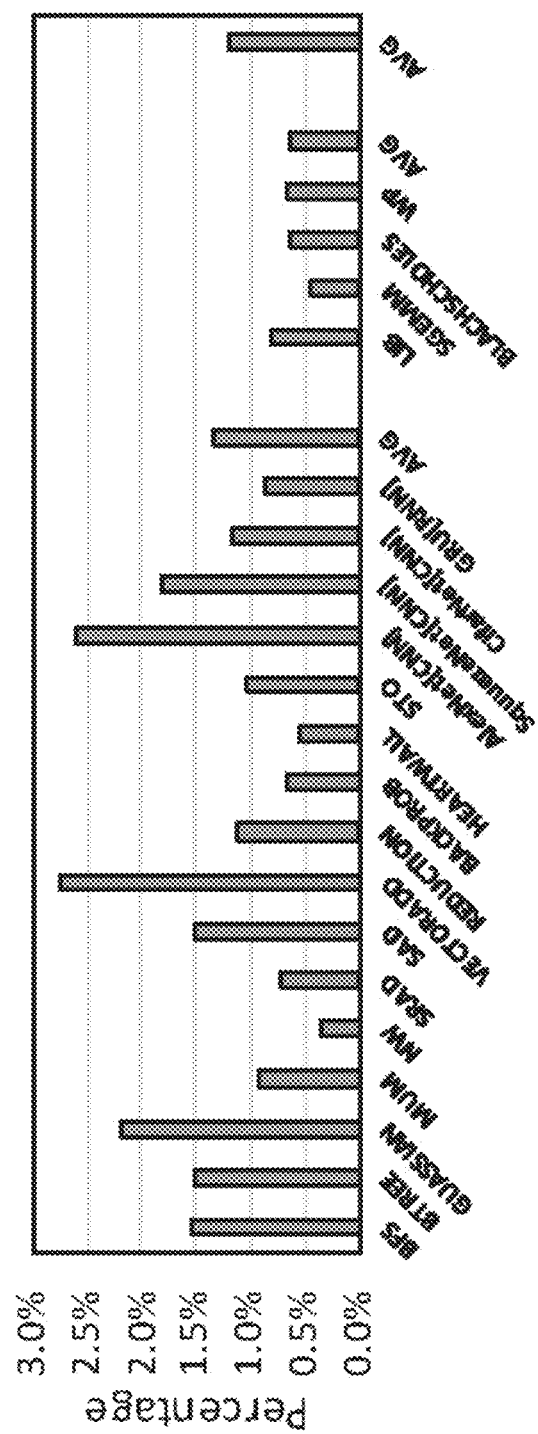
FIG. 19 is a graph that shows the static code size increase due to the addition of extra instructions.

Software Overheads: FIG. 19 shows the static code increase due to the addition of extra instructions to guide CORF. Overall, CORF only increases the code size by 1.3%. Passing information in CORF++ can be simplified, for example, by having the compiler choose odd register numbers for the left operands, and even numbers for the right operands without explicit metadata instructions. When considering dynamic instruction count, this overhead will be significantly lower.

Spatially relative terms such as "under," "below," "lower," "over," "upper," "left," "right," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising," and the like are open ended terms that indicate the presence of stated elements or features, but do not preclude additional elements or features. The articles "a," "an" and "the" are intended to include the plural as well as the singular, unless the context clearly indicates otherwise.

Although this invention has been disclosed in the context of certain implementations and examples, it will be understood by those skilled in the art that the present invention extends beyond the specifically disclosed implementations to other alternative implementations and/or uses of the invention and obvious modifications and equivalents thereof. Thus, it is intended that the scope of the present invention herein disclosed should not be limited by the particular disclosed implementations described above.

Furthermore, the skilled artisan will recognize the interchangeability of various features from different implementations. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular implementation of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. A method for enhancing graphics processing unit (GPU) performance, comprising:
   providing a GPU operand register file;
   coalescing GPU register reads with a first set of instructions executable on a processor utilizing compiler-assisted hints to identify GPU register pairs in GPU register pair information to pack related GPU registers together; and
   attempting to pack the identified GPU register pairs into the same physical GPU register entry to increase coalescing opportunities during a runtime of the GPU with a second set of instructions executable on a processor, wherein a GPU register is allocated for the first time it appears as the destination of an instruction, and wherein said GPU register is configured to be reallocated when its size changes and in response to an allocation event, the second set of instructions checks the GPU register pair information to determine if the GPU register belongs to a GPU register pair and in response to determining that the GPU register belongs to a GPU register pair, common pair allocation logic is used to pack said GPU register, in response to determining that the GPU register does not belong to a GPU register pair, a default allocation policy is used.

2. The method of claim 1, providing compiler-assisted instructions.

3. The method of claim 2, comprising performing a compile-time graph coloring analysis to solve a bipartite graph frustration problem.

4. The method of claim 2, wherein the compiler-assisted instructions create run-time code for configuring the operand register file as a coalesced operand register file (CORF).

5. The method of claim 4, comprising providing a register file virtualization to reduce the effective size of the coalesced operand register file.

6. The method of claim 5, comprising configuring the coalesced operand register file to allow coalescing reads across different physical registers that reside in mutually exclusive sub-banks.

7. The method of claim 1, wherein the common pair allocation logic identifies exclusive common pair registers that are most frequently accessed together with the same instruction.

8. A system for providing enhanced graphics processing unit (GPU) performance and energy efficiency, comprising:
   a GPU operand register file;
   a first set of instructions executable on a processor-to coalesce GPU register reads utilizing compiler-assisted hints to identify GPU register pairs in register pair information to pack related GPU registers together; and
   a second set of instructions executable on a processor-to attempt to pack the identified GPU register pairs into the same physical register entry to increase coalescing opportunities during a runtime of the GPU, wherein a GPU register is allocated for the first time it appears as the destination of an instruction, and wherein said GPU register is configured to be reallocated when its size changes and in response to an allocation event, the second set of instructions checks the GPU register pair information to determine if the GPU register belongs to a GPU register pair and in response to determining that the GPU register belongs to a GPU register pair, common pair allocation logic is used to pack said GPU register, in response to determining that the GPU register does not belong to a register pair, a default allocation policy is used.

9. The system of claim 8, wherein the first and second sets of instructions are each guided by compiler-assisted instructions.

10. The system of claim 9, comprising a compile-time graph coloring analysis used to solve a bipartite graph frustration problem.

11. The system of claim 9, wherein the compiler-assisted instructions are for creating run-time code for configuring the operand register file as a coalesced operand register file (CORF).

12. The system of claim 11, wherein a register file virtualization is provided to reduce the effective size of the coalesced operand register file.

13. The system of claim 12, wherein the coalesced operand register file is configured to allow coalescing reads across different physical registers that reside in mutually exclusive sub-banks.

14. The system of claim 8, wherein the common pair allocation logic identifies exclusive common pair registers that are most frequently accessed together with the same instruction.

* * * * *